US012754400B2

(12) United States Patent
Zhang et al.

(10) Patent No.: US 12,754,400 B2
(45) Date of Patent: Oct. 6, 2026

(54) OPTICAL LENS, CAMERA MODULE, AND ELECTRONIC DEVICE

(71) Applicant: HUAWEI TECHNOLOGIES CO., LTD., Shenzhen (CN)

(72) Inventors: Kaiyuan Zhang, Dongguan (CN); Xiaofang Wang, Dongguan (CN); Sichen Long, Dongguan (CN); Haishui Ye, Shanghai (CN); Wei Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 193 days.

(21) Appl. No.: 18/845,523

(22) PCT Filed: Mar. 6, 2023

(86) PCT No.: PCT/CN2023/079800
§ 371 (c)(1),
(2) Date: Sep. 10, 2024

(87) PCT Pub. No.: WO2023/169354
PCT Pub. Date: Sep. 14, 2023

(65) Prior Publication Data

US 2025/0180871 A1 Jun. 5, 2025

(30) Foreign Application Priority Data

Mar. 10, 2022 (CN) ........................ 202210234151.8

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ................................ G03B 17/12; G02B 13/06
(Continued)

(56) References Cited

U.S. PATENT DOCUMENTS 8,179,614 B1 * 5/2012 Tsai .................. G02B 13/0045 359/764
2019/0121100 A1 * 4/2019 Song ..................... G02B 13/00
(Continued)

FOREIGN PATENT DOCUMENTS

CN 110073264 A 7/2019
CN 110554485 A 12/2019
(Continued)

OTHER PUBLICATIONS

International Search Report and Written Opinion in International Appln. No. PCT/CN2023/079800, mailed on Apr. 14, 2023, 17 pages (with English translation).
(Continued)

*Primary Examiner* — Lin Ye
(74) *Attorney, Agent, or Firm* — Fish & Richardson P.C.

(57) ABSTRACT

An example optical lens includes at least seven lenses that are arranged from an object side to an image side, where in a direction from the object side to the image side, a first lens has a positive optical power, an object side surface that is of the first lens and that is near an optical axis is a convex surface, an image side surface that is of the first lens and that is near the optical axis is a concave surface, and a last lens has a negative focal power; and a back focal length BFL of the optical lens satisfies: BFL≤2.5 mm.

20 Claims, 12 Drawing Sheets

(58) Field of Classification Search
USPC .................................................. 359/708, 764
See application file for complete search history.

(56) References Cited

U.S. PATENT DOCUMENTS

| | | | | |
|---|---|---|---|---|
| 2021/0141194 | A1* | 5/2021 | Jung | G02B 5/20 |
| 2021/0149160 | A1 | 5/2021 | Dong et al. | |
| 2021/0191082 | A1 | 6/2021 | Zhang et al. | |
| 2021/0364758 | A1* | 11/2021 | Yu | G02B 13/0045 |
| 2022/0206269 | A1* | 6/2022 | Nitta | G02B 9/64 |
| 2023/0353855 | A1* | 11/2023 | Rudnick | G02B 13/0045 |

FOREIGN PATENT DOCUMENTS

| | | | |
|---|---|---|---|
| CN | 110703412 | A | 1/2020 |
| CN | 111308662 | A | 6/2020 |
| CN | 111308663 | A | 6/2020 |
| CN | 111781705 | A | 10/2020 |
| CN | 112269248 | A | 1/2021 |
| CN | 213276105 | U | 5/2021 |
| CN | 113259573 | A | 8/2021 |
| CN | 113721350 | A | 11/2021 |
| CN | 113741002 | A | 12/2021 |
| CN | 114415354 | A | 4/2022 |
| WO | 2021232498 | A1 | 11/2021 |

OTHER PUBLICATIONS

Extended European Search Report in European Appln. No. 23765932.1, mailed on May 26, 2025, 8 pages.

* cited by examiner

OPTICAL LENS, CAMERA MODULE, AND ELECTRONIC DEVICE

CROSS-REFERENCE TO RELATED APPLICATIONS

This application is a National Stage of International Application No. PCT/CN2023/079800, filed on Mar. 6, 2023, which claims priority to Chinese Patent Application No. 202210234151.8, filed on Mar. 10, 2022, both of which are hereby incorporated by reference in their entireties.

TECHNICAL FIELD

This application relates to the field of electronic device technologies, and in particular, to an optical lens, a camera module, and an electronic device.

BACKGROUND

With development of intelligent terminal technologies and diversified consumption requirements, a user has an increasingly high requirement on mobile phone photographing, and performance parameters that affect imaging quality, such as an optical format, a depth of field, and a resolution of a mobile phone lens, need to be further improved. In addition, due to influence of a development trend of mobile phone thinning and a demand for foldable mobile phone application, a total track length of the mobile phone lens has become an important reason for restricting an overall thickness of a mobile phone. For a mobile phone lens with a large optical format, a total track length of the lens is a main factor that affects imaging quality. However, it is often difficult for a current mobile phone lens to meet design requirements of the optical format and the total track length.

SUMMARY

This application provides an optical lens, a camera module, and an electronic device, to reduce a size of the optical lens while ensuring imaging quality of the optical lens.

According to a first aspect, this application provides an optical lens. The optical lens may include at least seven lenses with a focal power, and the at least seven lenses are arranged in a direction from an object side to an image side. During specific disposing, in a direction from the object side to the image side, a first lens has a positive optical power, an object side surface that is of the first lens and that is near an optical axis is a convex surface, an image side surface that is of the first lens and that is near the optical axis is a concave surface, and a last lens has a negative focal power. A back focal length BFL of the optical lens may satisfy: BFL≤2.5 mm. In addition, a point that is of the object side surface of the first lens and that is farthest away from an imaging surface of the optical lens in projection points of the optical axis of the optical lens is defined as O1, a point that is of an image side surface of the last lens and that is closest to the imaging surface in the projection points of the optical axis is defined as Ox, x is a quantity of lenses, a distance between O1 and Ox is TTL1, and TTL1 and an image height that can be formed by the optical lens on the imaging surface of the optical lens satisfy: TTL1/IH≤0.57.

The optical lens in the foregoing solution may be used in a camera module that uses a pop-up design. A total track length of the optical lens in a non-pop-up state of the camera module is small, so that an electronic device in which the camera module is used can implement a thinning design. In addition, the optical lens has a long back focus length when the camera module is in a pop-up state. Therefore, this facilitates a focusing or zoom operation of the camera module, and helps the camera module achieve good photographing effect.

In some possible implementation solutions, the optical lens may further include a variable aperture disposed on an object side of the first lens arranged in the direction from the object side to the image side, and an aperture diameter of the variable aperture is adjustable, so that adjustment of an F-number of the optical lens can be implemented.

In some possible implementation solutions, a maximum entrance pupil diameter EPDmax and a minimum entrance pupil diameter EPDmin of the optical lens and a focal length EFL of the optical lens may satisfy: 1.6≤EFL/(EPDmax−EPDmin)≤3, and an entrance pupil diameter can be implemented by adjusting the variable aperture. In this design, the optical lens can provide different depth of field ranges for different scenes, and the optical lens can therefore meet photographing requirements of a plurality of scenes.

In some possible implementation solutions, in the direction from the object side to the image side, a focal length f1 of the first lens and the focal length EFL of the optical lens satisfy: f1/EFL≤1.3. The optical lens can achieve good imaging quality through reasonable allocation of a focal power.

In some possible implementation solutions, the focal length EFL of the optical lens and a maximum half-field of view HFOV of the optical lens satisfy: EFL×tan(HFOV)≥7 mm. In this design, the camera module can have a large optical format, thereby improving imaging brightness and a resolution.

In some possible implementation solutions, a total track length TTL of the optical lens, the image height IH that can be formed by the optical lens on the imaging surface of the optical lens, and an F-number F # of the optical lens satisfy: $IH^2/(TTL^2 \times F\ \#) \geq 1.2$. This can increase an amount of light admitted by the optical lens and facilitate a thinning design of the optical lens.

In some possible implementation solutions, the F-number F # of the optical lens and the image height IH that can be formed by the optical lens on the imaging surface of the optical lens satisfy: IH/(4×F #)≥1.85. Under this condition, an optical format of the optical lens can be increased, and an amount of light admitted by the optical lens can be increased.

In some possible implementation solutions, in the direction from the object side to the image side, a refractive index n2 of a second lens satisfies: 1.6≤n2≤2.1. The second lens is designed to have a high refractive index, which helps correct an aberration of the optical lens.

In some possible implementation solutions, in the direction from the object side to the image side, an Abbe coefficient vd1 of the first lens and an Abbe coefficient vd2 of the second lens satisfy: |vd1−vd2|≥40. A chromatic aberration of the optical lens can be reduced, and image quality of the optical lens can be improved through reasonable allocation of system material distribution.

In some possible implementation solutions, in the direction from the object side to the image side, at least one surface in an object side surface and an image side surface of a penultimate lens may be a reversely curved surface. This helps improve image quality of an edge field of view of the camera module.

Similarly, in the direction from the object side to the image side, at least one surface in an object side surface and the image side surface of the last lens may also be a reversely curved surface, to further improve image quality of an edge field of view of the camera module.

In some possible implementation solutions, the total track length TTL of the optical lens and the back focal length BFL of the optical system may satisfy: 5≤TTL/BFL≤8. This design can ensure that the optical lens has a long back focal length, and provide space for a pop-up design of a camera module in which the optical lens is used.

In some possible implementation solutions, an intersection point of the image side surface of the first lens arranged in the direction from the object side to the image side and the optical axis of the optical lens is defined as $O1_1$, a projection point of an edge of the image side surface of the first lens on the optical axis is defined as $O1_2$, a distance between $O1_1$ and $O1_2$ is sag1, an intersection point of the object side surface of the second lens arranged in the direction from the object side to the image side and the optical axis is defined as $O2_1$, a projection point of an edge of the object side surface of the second lens on the optical axis is defined as $O2_2$, a distance between $O2_1$ and $O2_2$ is sag2, and a distance between the image side surface of the first lens and the object side surface of the second lens is defined as T12; and sag1, sag2, and T12 may satisfy: T12−sag1+sag2≥0.35 mm. This can provide structural space for optical lens coupling, and improve imaging quality of the optical lens.

In some possible implementation solutions, an entrance pupil diameter EPD of the optical lens and a half-image height ImgH that can be formed by the optical lens on the imaging surface of the optical lens satisfy: 0.5≤EPD/ImgH≤0.8. Under this condition, a large aperture design can be implemented for the optical lens, thereby increasing an amount of light admitted by the optical lens.

In some possible implementation solutions, in the direction from the object side to the image side, a center thickness CT2 and an edge thickness ET2 of the second lens satisfy: 0.8≤CT2/ET2≤1.1, to ensure processability of the second lens and increase a yield of optical lens.

The following uses the optical lens including the seven lenses as an example to describe several specific structural forms of the optical lens. It should be noted that, in the direction from the object side to the image side, the seven lenses of the optical lens are respectively the first lens, the second lens, a third lens, a fourth lens, a fifth lens, a sixth lens, and a seventh lens.

TTL1 and the image height IH of the optical lens satisfy: TTL1/IH=0.49. TTL1 is a distance between the point O1 that is of the object side surface of the first lens and that is farthest away from the imaging surface in the projection points of the optical axis and a point O7 that is of an image side surface of the seventh lens and that is closest to the imaging surface in the projection points of the optical axis, the first lens has the positive focal power, the focal length f1 of the first lens and the focal length EFL of the optical lens satisfy: f1/EFL=1.26, the second lens has a positive focal power, a focal length f2 of the second lens and the focal length EFL of the optical lens satisfy: f2/EFL=282, the refractive index n2 of the second lens is 2.011, the Abbe coefficient vd1 of the first lens and the Abbe coefficient vd2 of the second lens are: vd1-vd2=75.8, the third lens has a negative focal power, the fourth lens has a positive focal power, a focal length f3 of the third lens, a focal length f4 of the fourth lens, and the focal length EFL of the optical lens satisfy: EFL×(f3+f4)/(f3−f4)=−0.43095, the fifth lens has a positive focal power, a focal length f5 of the fifth lens and the focal length EFL of the optical lens satisfy: f5/EFL=7.57, the sixth lens has a positive focal power, a focal length f6 of the sixth lens and the focal length EFL of the optical lens satisfy: f6/EFL=1.3, the seventh lens has a negative optical power, and a focal length f7 of the seventh lens and the focal length EFL of the optical lens satisfy: f7/EFL=−0.72.

Alternatively, TTL1 and the image height IH that can be formed by the optical lens on the imaging surface of the optical lens satisfy: TTL1/IH=0.505. TTL1 is a distance between the point O1 that is of the object side surface of the first lens and that is farthest away from the imaging surface in the projection points of the optical axis and a point O7 that is of an image side surface of the seventh lens and that is closest to the imaging surface in the projection points of the optical axis, the first lens has the positive focal power, the focal length f1 of the first lens and the focal length EFL of the optical lens satisfy: f1/EFL=1.125, the second lens has a negative focal power, a focal length f2 of the second lens and the focal length EFL of the optical lens satisfy: f2/EFL=−13.9, the refractive index n2 of the second lens is 1.677, the Abbe coefficient vd1 of the first lens and the Abbe coefficient vd2 of the second lens satisfy: vd1−vd2=75.8, the third lens has a negative focal power, the fourth lens has a positive focal power, a focal length f3 of the third lens, a focal length f4 of the fourth lens, and the focal length EFL of the optical lens satisfy: EFL×(f3+f4)/(f3−f4)=−0.74464, the fifth lens has a positive focal power, a focal length f5 of the fifth lens and the focal length EFL of the optical lens satisfy: f5/EFL=2.6972, the sixth lens has a positive focal power, a focal length f6 of the sixth lens and the focal length EFL of the optical lens satisfy: f6/EFL=2.847, the seventh lens has a negative optical power, and a focal length f7 of the seventh lens and the focal length EFL of the optical lens satisfy: f7/EFL=−0.881.

Alternatively, TTL1 and the image height IH that can be formed by the optical lens on the imaging surface of the optical lens satisfy: TTL1/IH=0.506. TTL1 is a distance between the point O1 that is of the object side surface of the first lens and that is farthest away from the imaging surface in the projection points of the optical axis and a point O7 that is of an image side surface of the seventh lens and that is closest to the imaging surface in the projection points of the optical axis, the first lens has the positive focal power, the focal length f1 of the first lens and the focal length EFL of the optical lens satisfy: f1/EFL=1.036, the second lens has a negative focal power, a focal length f2 of the second lens and the focal length EFL of the optical lens satisfy: f2/EFL=−5.24, the refractive index n2 of the second lens is 1.677, the Abbe coefficient vd1 of the first lens and the Abbe coefficient vd2 of the second lens satisfy: vd1−vd2=62.32, the third lens has a negative focal power, the fourth lens has a positive focal power, a focal length f3 of the third lens, a focal length f4 of the fourth lens, and the focal length EFL of the optical lens satisfy: EFL×(f3+f4)/(f3−f4)=0.1578, the fifth lens has a negative focal power, a focal length f5 of the fifth lens and the focal length EFL of the optical lens satisfy: f5/EFL=−1.519, the sixth lens has a positive focal power, a focal length f6 of the sixth lens and the focal length EFL of the optical lens satisfy: f6/EFL=0.755, the seventh lens has a negative optical power, and a focal length f7 of the seventh lens and the focal length EFL of the optical lens satisfy: f7/EFL=−1.016.

Alternatively, TTL1 and the image height IH that can be formed by the optical lens on the imaging surface of the optical lens satisfy: TTL1/IH=0.51. TTL1 is a distance between the point O1 that is of the object side surface of the first lens and that is farthest away from the imaging surface in the projection points of the optical axis and a point O7 that is of an image side surface of the seventh lens and that is closest to the imaging surface in the projection points of the optical axis, the first lens has the positive focal power, the focal length f1 of the first lens and the focal length EFL of the optical lens satisfy: f1/EFL=1.19, the second lens has a negative focal power, a focal length f2 of the second lens and the focal length EFL of the optical lens satisfy: f2/EFL=−10.38, the refractive index n2 of the second lens is 1.677, the Abbe coefficient vd1 of the first lens and the Abbe coefficient vd2 of the second lens satisfy: vd1−vd2=58.76, the third lens has a negative focal power, the fourth lens has a positive focal power, a focal length f3 of the third lens, a focal length f4 of the fourth lens, and the focal length EFL of the optical lens satisfy: EFL×(f3+f4)/(f3−f4)=−0.436, the fifth lens has a negative focal power, a focal length f5 of the fifth lens and the focal length EFL of the optical lens satisfy: f5/EFL=−1.749, the sixth lens has a positive focal power, a focal length f6 of the sixth lens and the focal length EFL of the optical lens satisfy: f6/EFL=0.6535, the seventh lens has a negative optical power, and a focal length f7 of the seventh lens and the focal length EFL of the optical lens satisfy: f7/EFL=−0.796.

Alternatively, TTL1 and the image height IH that can be formed by the optical lens on the imaging surface of the optical lens satisfy: TTL1/IH=0.49. TTL1 is a distance between the point O1 that is of the object side surface of the first lens and that is farthest away from the imaging surface in the projection points of the optical axis and a point O7 that is of an image side surface of the seventh lens and that is closest to the imaging surface in the projection points of the optical axis, the first lens has the positive focal power, the focal length f1 of the first lens and the focal length EFL of the optical lens satisfy: f1/EFL=1.138, the second lens has a negative focal power, a focal length f2 of the second lens and the focal length EFL of the optical lens satisfy: f2/EFL=−9.22, the refractive index n2 of the second lens is 1.677, the Abbe coefficient vd1 of the first lens and the Abbe coefficient vd2 of the second lens satisfy: vd1−vd2=75.85, the third lens has a negative focal power, the fourth lens has a positive focal power, a focal length f3 of the third lens, a focal length f4 of the fourth lens, and the focal length EFL of the optical lens satisfy: EFL×(f3+f4)/(f3−f4)=1.006, the fifth lens has a positive focal power, a focal length f5 of the fifth lens and the focal length EFL of the optical lens satisfy: f5/EFL=23.05, the sixth lens has a positive focal power, a focal length f6 of the sixth lens and the focal length EFL of the optical lens satisfy: f6/EFL=1.077, the seventh lens has a negative optical power, and a focal length f7 of the seventh lens and the focal length EFL of the optical lens satisfy: f7/EFL=−0.602.

Alternatively, TTL1 and the image height IH that can be formed by the optical lens on the imaging surface of the optical lens satisfy: TTL1/IH=0.49. TTL1 is a distance between the point O1 that is of the object side surface of the first lens and that is farthest away from the imaging surface in the projection points of the optical axis and a point O7 that is of an image side surface of the seventh lens and that is closest to the imaging surface in the projection points of the optical axis, the first lens has the positive focal power, the focal length f1 of the first lens and the focal length EFL of the optical lens satisfy: f1/EFL=1.14, the second lens has a negative focal power, a focal length f2 of the second lens and the focal length EFL of the optical lens satisfy: f2/EFL=−10.1, the refractive index n2 of the second lens is 1.677, the Abbe coefficient vd1 of the first lens and the Abbe coefficient vd2 of the second lens satisfy: vd1−vd2=75.85, the third lens has a negative focal power, the fourth lens has a positive focal power, a focal length f3 of the third lens, a focal length f4 of the fourth lens, and the focal length EFL of the optical lens satisfy: EFL×(f3+f4)/(f3−f4)=1.22, the fifth lens has a negative focal power, a focal length f5 of the fifth lens and the focal length EFL of the optical lens satisfy: f5/EFL=−2.46, the sixth lens has a positive focal power, a focal length f6 of the sixth lens and the focal length EFL of the optical lens satisfy: f6/EFL=0.845, the seventh lens has a negative optical power, and a focal length f7 of the seventh lens and the focal length EFL of the optical lens satisfy: f7/EFL=−0.694.

According to a second aspect, this application further provides a camera module. The camera module may include a photosensitive chip and the optical lens according to any one of the possible implementation solutions. The photosensitive chip may be disposed on an imaging surface of the optical lens, and the photosensitive chip may be configured to convert an optical signal transmitted by the optical lens into an image signal. The camera module has good photographing effect, and can meet photographing requirements of different scenes.

According to a third aspect, this application further provides an electronic device. The electronic device may include a housing and the camera module according to the foregoing implementation solution. The camera module is disposed in the housing, and the camera module has a first state of being located inside the housing and a second state of being at least partially popped up to the outside of the housing. A height of the camera module that is in the first state and that is of the electronic device is small, and therefore helps implement a thinning design of the electronic device.

REFERENCE NUMERALS

1: electronic device; 100: housing; 200: display; 300: circuit board; 400: camera module; 110: middle frame;
120: rear cover; 210: display panel; 220: first cover plate; 310: avoidance space; 121: light inlet hole;
122: camera decorating part; 123: second cover plate; 410: optical lens; 420: module circuit board; 430: photosensitive chip;
440: light filter; 421: sunken groove; and 450: support component.

DESCRIPTION OF EMBODIMENTS

To facilitate understanding of an optical lens provided in embodiments of this application, related English abbreviations and noun concepts in this application are briefly described first.

F #: F-number, F-number/aperture, is a relative value (a reciprocal of a relative aperture) obtained by dividing a focal length of an optical lens by an entrance pupil diameter of the optical lens. A larger aperture indicates a smaller F-number (F #) and a larger amount of light admitted per unit of time. A smaller depth of field leads to a blur of photographed background content, which is similar to effect of a long-focus lens.

EFL: effect focal length, is an effective focal length of an optical lens.

BFL: back focal length, is a back focal length of an optical lens, and is defined as a distance between a lens that is of the optical lens and that is closest to an imaging surface and a photosensitive chip.

TTL: total track length, is a total track length of an optical lens, and is specifically a distance between a surface that is of the optical lens and that is closest to a photographed object and an imaging surface.

EPD: entrance pupil diameter, is an entrance pupil diameter, and limits an effective aperture of an incident light beam.

IH: image height, is an image height, namely, a holographic height of an image formed by an optical lens on an imaging surface.

FOV: field of view, is a field of view, namely, an included angle formed, by using an optical lens as a vertex, by two edges of a maximum range of the optical lens through which an object image of a photographed target can pass, or may be understood as a maximum field of view that can be imaged by an optical lens.

HFOV: Half-FOV, is a half-field of view.

Focal power: is equal to a difference between an image-side beam convergence degree and an object-side beam convergence degree. A lens with a positive focal power has a positive focal length and may converge light, and a lens with a negative focal power has a negative focal length and may diverge light.

An object side may be understood as a side close to a photographed object, and an image side may be understood as a side close to an imaging surface.

An object side surface of a lens is a surface of a side that is of the lens and that is close to a photographed object, and an image side surface of the lens is a surface of a side that is of the lens and that is close to an imaging surface.

An area close to an optical axis may be understood as an area that is on a surface of a lens and that is close to the optical axis.

Figure 1:
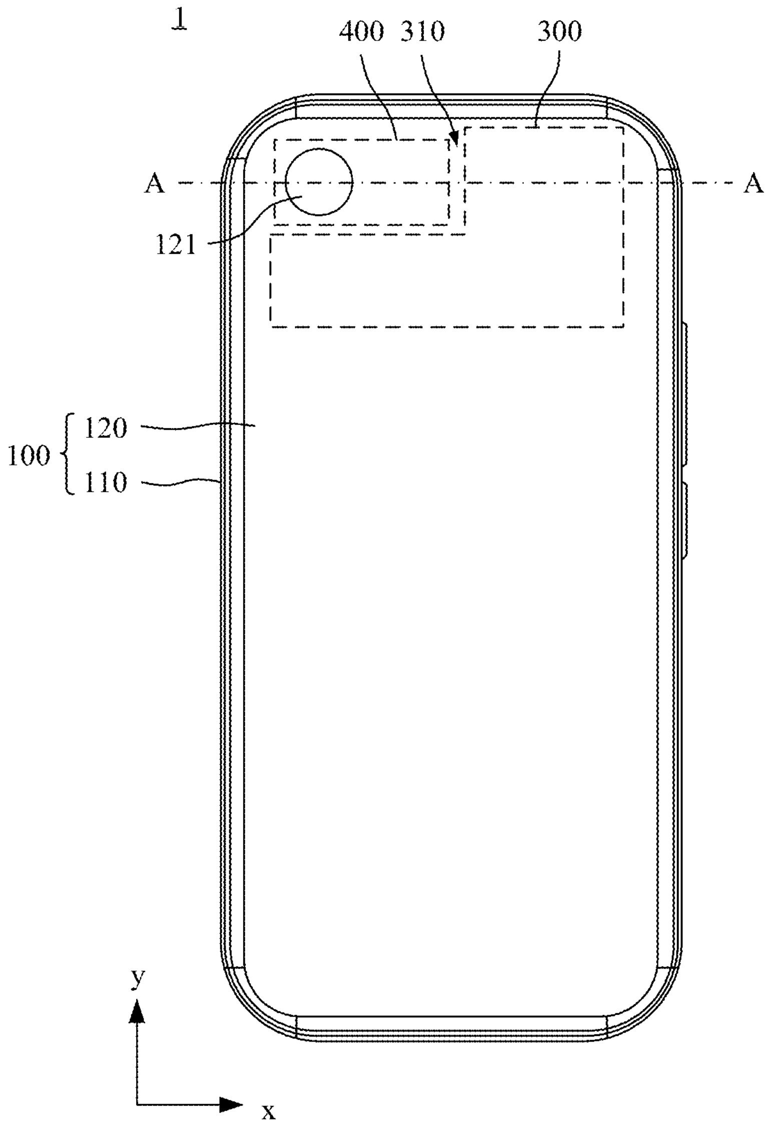
FIG. 1 is a schematic diagram of a structure of an electronic device according to an embodiment of this application.

FIG. 1 is a schematic diagram of a structure of an electronic device according to an embodiment of this application. The electronic device 1 may be a mobile phone, a tablet computer (tablet personal computer), a laptop computer (laptop computer), a personal digital assistant (personal digital assistant, PDA for short), a camera, a personal computer, a notebook computer, a vehicle-mounted device, a wearable device, augmented reality (augmented reality, AR for short) glasses, an AR helmet, virtual reality (virtual reality, VR for short) glasses, a VR helmet, or another form of device with photographing and video recording functions. The electronic device in the embodiment shown in FIG. 1 is described by using the mobile phone as an example.

Figure 2:
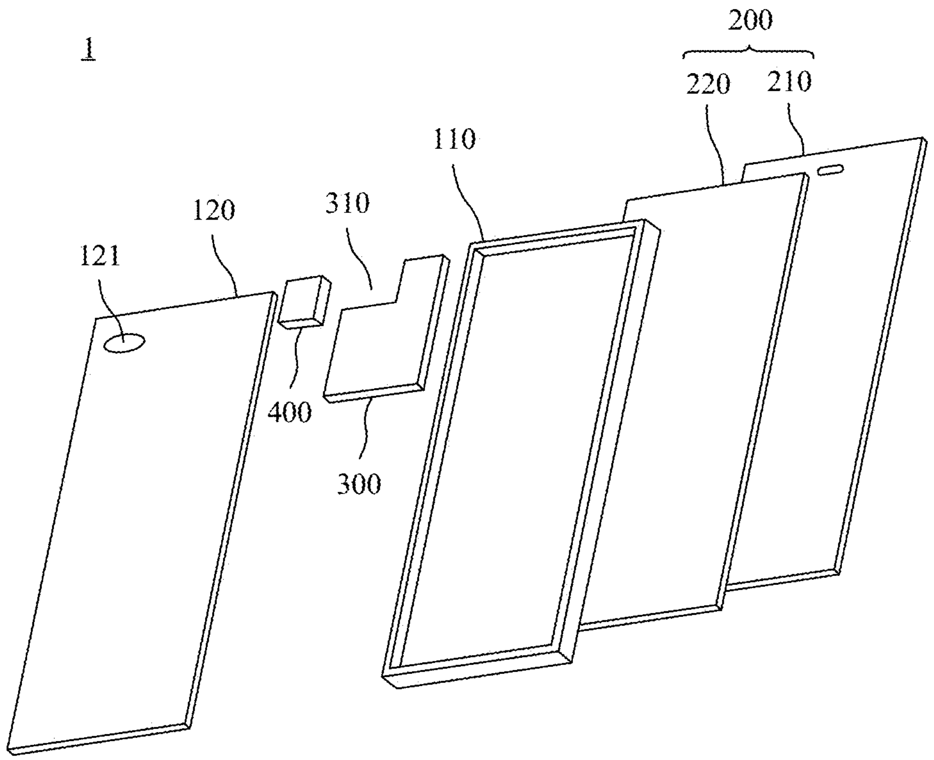
FIG. 2 is a schematic exploded partial view of the electronic device in FIG. 1.

FIG. 2 is a schematic exploded partial view of the electronic device in FIG. 1. Refer to both FIG. 1 and FIG. 2. The electronic device 1 may include a housing 100, a display 200, a circuit board 300, and a camera module 400. It should be noted that FIG. 1, FIG. 2, and the following related accompanying drawings schematically show only some components included in the electronic device 1, and actual shapes, actual sizes, actual positions, and actual structures of these components are not limited in FIG. 1, FIG. 2, and the following accompanying drawings.

For ease of description, a width direction of the electronic device 1 is defined as an x axis, a length direction of the electronic device is defined as a y axis, and a thickness direction of the electronic device 1 is defined as a z axis, where every two of the x axis, the y axis, and the z axis are perpendicular to each other. It may be understood that a coordinate system of the electronic device 1 may be flexibly set based on a specific actual requirement.

The housing 100 may include a middle frame 110 and a rear cover 120, and the rear cover 120 is fastened to one side of the middle frame 110. In an implementation, the rear cover 120 may be fastened to the middle frame 110 by using an adhesive. In another implementation, the rear cover 120 and the middle frame 110 may alternatively form an integrally formed structure, that is, the rear cover and the middle frame are of an overall structure.

In other embodiments, the housing 100 may alternatively include a middle plate (not shown in the figure). The middle plate is connected to an inner side of the middle frame 110, and is opposite to and spaced from the rear cover 120.

Refer to FIG. 2 again. The display 200 is fastened to the other side that is of the middle frame 110 and that is opposite to the rear cover 120. In this case, the display 200 is disposed opposite to the rear cover 120. The display 200, the middle frame 110, and the rear cover 120 together enclose the inside of the electronic device 1. Components of the electronic device 1 such as the circuit board 300, the camera module 400, a battery, a receiver, and a microphone may be placed inside the electronic device 1.

In this embodiment, the display 200 is configured to display an image, text, and the like. The display 200 may be a flat screen, or may be a curved screen. The display 200 includes a display panel 210 and a first cover plate 220. The first cover plate 220 is stacked on a side that is of the display panel 210 and that is away from the middle frame 110. The first cover plate 220 may be disposed close to the display panel 210, and may be mainly configured to protect and prevent the display panel 210 from dust. A material of the first cover plate 220 is a transparent material, for example, may be glass or plastic. The display panel 210 may be a liquid crystal display (liquid crystal display, LCD), an organic light-emitting diode (organic light-emitting diode, OLED) display panel, an active-matrix organic light-emitting diode or an active-matrix organic light-emitting diode (active-matrix organic light-emitting diode, AMOLED) display panel, a quantum dot light emitting diode (quantum dot light emitting diode, QLED) display panel, a micro light-emitting diode (micro light-emitting diode, micro-LED) display panel, or the like.

Figure 3:
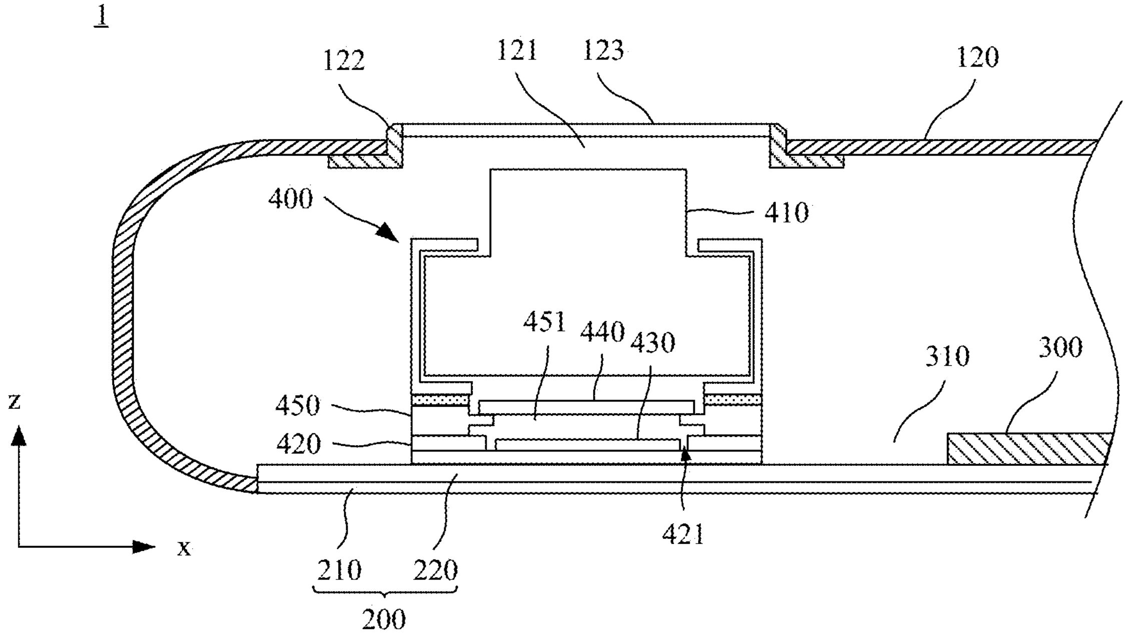
FIG. 3 is a partial sectional view of the electronic device in FIG. 1 at A-A.

FIG. 3 is a partial sectional view of the electronic device in FIG. 1 at A-A. Refer to both FIG. 2 and FIG. 3. The circuit board 300 is fastened inside the electronic device 1. Specifically, the circuit board 300 may be fastened to a side that is of the display 200 and that faces the rear cover 120. In other embodiments, when the middle frame 110 includes the middle plate, the circuit board 300 may be fastened to a surface of a side that is of the middle plate and that faces the rear cover 120. It may be understood that the circuit board 300 may be a rigid circuit board, may be a flexible circuit board, or may be a rigid-flex circuit board. The circuit board 300 may be configured to carry electronic components such as a chip, a capacitor, and an inductor, and may implement electrical connections among the electronic components. The chip may be a central processing unit (central processing unit, CPU), a graphics processing unit (graphics processing unit, GPU), a digital signal processing chip (digital signal processing, DSP), a universal flash storage (universal flash storage, UFS), or the like.

Still refer to FIG. 2 and FIG. 3. The camera module 400 is fastened inside the housing 100, and is configured to enable the electronic device 1 to implement the function like photographing or video recording. Specifically, the camera module 400 may be fastened to the side that is of the display 200 and that faces the rear cover 120. In other embodiments, when the middle frame 110 includes the middle plate, the camera module 400 may alternatively be fastened to the surface of the side that is of the middle plate and that faces the rear cover 120.

In addition, avoidance space 310 may be disposed on the circuit board 300, and a shape of the avoidance space 310 may be a shape matching a shape of the camera module 400, for example, a rectangular shape shown in FIG. 2. Certainly, in other implementations, the avoidance space 310 may alternatively be a circle, an ellipse, another irregular shape, or the like. This is not specifically limited in this application. The camera module 400 is located in the avoidance space 310. In this way, in a z-axis direction, the camera module 400 and the circuit board 300 have an overlapping area, thereby avoiding an increase in thickness of the electronic device 1 caused by stacking of the camera module 400 on the circuit board. In other embodiments, the avoidance space 310 may not be disposed on the circuit board 300. In this case, the camera module 400 may be directly stacked on the circuit board 300, or may be spaced from the circuit board 300 by using another support structure.

In this embodiment, the camera module 400 is electrically connected to the circuit board 300. Specifically, the camera module 400 is electrically connected to the CPU through the circuit board 300. When the CPU receives an instruction of a user, the CPU can send a signal to the camera module 400 through the circuit board 300, to control the camera module 400 to take an image or record a video. In other embodiments, when the circuit board 300 is not disposed in the electronic device 1, the camera module 400 may alternatively directly receive the instruction of the user, and take an image or record a video based on the instruction of the user.

Refer to FIG. 3 again. A light inlet hole 121 is disposed on the rear cover 120, and the light inlet hole 121 may connect the inside of the electronic device 1 to the outside of the electronic device 1. The electronic device 1 further includes a camera decorating part 122 and a second cover plate 123. A part of the camera decorating part 122 may be fastened to an inner surface of the rear cover 120, and a part of the camera decorating part 122 contacts a hole wall of the light inlet hole 121. The second cover plate 123 is fastened to an inner wall of the camera decorating part 122. The camera decorating part 122 and the second cover plate 123 separate the inside of the electronic device 1 from the outside of the electronic device 1, to prevent external water or dust from entering the inside of the electronic device 1 through the light inlet hole 121. A material of the second cover plate 123 is a transparent material, for example, may be glass or plastic.

It may be understood that a shape of the light inlet hole 121 is not limited to a circle shown in FIG. 1 and FIG. 2. For example, the shape of the light inlet hole 121 may be an ellipse, another irregular shape, or the like.

It should be noted that, in some other embodiments, the camera module 400 may alternatively be fastened to a side that is of the rear cover 120 and that faces the display 200. In this case, a hole may be disposed on the display panel 210, and light outside the electronic device 1 can sequentially pass through the first cover plate 220 and the hole and enter the inside of the electronic device 1, to be collected by that camera module 400 and form an image or a video. In other words, the camera module 400 in this embodiment may be used as a front-facing camera module, or may be used as a rear-facing camera module. Specifically, the camera module 400 may be disposed based on a function requirement of the electronic device 1, and details are not described herein.

In some embodiments, the camera module 400 may include an optical lens 410, a module circuit board 420, a photosensitive chip 430, and a light filter 440. It should be noted that an optical axis direction of the optical lens 410 is the same as an optical axis direction of the camera module 400.

The optical lens 410 may be mounted between a photographed object (an object surface) and the photosensitive chip 430 (an image surface), and the optical lens 410 is configured to form an image (namely, an optical signal) of the photographed object. The photosensitive chip 430 is configured to convert the image (namely, the optical signal) of the photographed object into an image signal and output the image signal, to implement the photographing or video recording function of the camera module.

The module circuit board 420 is fastened to an out-light side of the optical lens 410, that is, the module circuit board 420 is located on an image side of the optical lens 410. The module circuit board 420 may be electrically connected to the circuit board to enable signal transmission between the circuit board and the module circuit board 420. It may be understood that the module circuit board 420 may be a rigid circuit board, may be a flexible circuit board, or may be a rigid-flex circuit board. This is not limited in this application.

Refer to FIG. 3. The photosensitive chip 430 is fastened to a side that is of the module circuit board 420 and that faces the optical lens 410. The photosensitive chip 430 is electrically connected to the module circuit board 420. In this way, after the photosensitive chip 430 collects ambient light, the photosensitive chip 430 may generate a signal based on the ambient light, and transmit the signal to the circuit board through the module circuit board 420. During specific implementation, the photosensitive chip 430 may be an image sensor like a metal-oxide-semiconductor element (complementary metal-oxide-semiconductor, CMOS) or a charge coupled element (charge coupled device, CCD).

In other implementations, an electronic component or another chip (for example, a drive chip) may be further mounted on the module circuit board 420. The electronic component or the another chip is disposed around the photosensitive chip 430. The electronic component or the another chip is configured to assist the photosensitive chip 430 in collecting the ambient light, and assist the photosensitive chip 430 in performing signal processing on the collected ambient light.

In other implementations, a sunken groove 421 may be disposed on a part of the module circuit board 420. In this case, the photosensitive chip 430 may be mounted inside the sunken groove 421. In this way, the photosensitive chip 430 and the module circuit board 420 have an overlapping area in the z-axis direction. In this case, the camera module 400 may be disposed to be thin in the z-axis direction.

Still refer to FIG. 3. The light filter 440 is fastened to a side that is of the photosensitive chip 430 and that faces the optical lens 410. The light filter 440 may be configured to filter out stray light of the ambient light that passes through the optical lens 410, and enable filtered ambient light to propagate to the photosensitive chip 430, to ensure that an image photographed by the electronic device has good definition. The light filter 440 may be but is not limited to a blue glass light filter. For example, the light filter 440 may be a reflective infrared light filter or a dual-bandpass filter (the dual-bandpass filter may allow visible light and infrared light in the ambient light to simultaneously pass through, allow visible light and light of another specified wavelength (for example, ultraviolet light) in the ambient light to simultaneously pass through, or allow infrared light and light of another specified wavelength (for example, ultraviolet light) to simultaneously pass through).

To fasten a position of the light filter 440, the camera module 400 may further include a support component 450 disposed between the optical lens 410 and the module circuit board 420. Two sides of the support component 450 are respectively fastened to the optical lens 410 and the module circuit board 420, and a specific fastening manner may be bonding. The light filter 440 may be disposed on one side of the support component 450. A through hole 451 is disposed in an area that corresponds to the photosensitive chip 430 and that is on the support component 450, so that the ambient light can smoothly enter the photosensitive chip 430.

In the camera module 400, the optical lens 410 is the most critical component that affects imaging quality of the camera module 400, and performance parameters such as an optical format, a depth of field, and a resolution of the camera module 400 are determined by the optical lens 410. A target surface may be understood as an imaging area on the photosensitive chip 430. A larger optical format is more conducive to improving imaging brightness and the resolution. The depth of field is a measured front-rear distance range of the photographed object within which a front edge of the optical lens 410 can obtain imaging of a clear image, or may be understood as, when the optical lens 410 completes focusing, a distance range of a clear image presented by a range before and after a focus. The depth of field of the optical lens 410 is related to an aperture. A larger aperture indicates a smaller depth of field, which is more conducive to highlighting a subject in a photographed image. A smaller aperture indicates a larger depth of field, which helps ensure simultaneously clear imaging of distant and close-up shots in a photographed image. For the camera module 400 with a large aperture and a large optical format, a total track length of the optical lens 410 becomes a main factor that affects the imaging quality of the optical lens 410. However, it is often difficult for the current optical lens 410 to meet design requirements of the optical format and the total track length.

The total track length of the optical lens 410 affects an overall height of the camera module 400, and the overall height of the camera module 400 is an important reference index for a thickness design of the electronic device 1. To reduce the overall height of the camera module 400, currently, a pop-up camera module design is started to be used on some electronic devices 1. In this design, the camera module 400 has two states: being located inside the electronic device 1 and being popped up from the light inlet hole 121 to the outside of the electronic device 1. For ease of description, the state in which the camera module 400 is located inside the electronic device 1 is referred to as a first state below. In this state, the camera module 400 usually does not perform photographing. Therefore, the first state may also be understood as a non-working state of the camera module 400. Correspondingly, the state in which the camera module 400 is popped up to the outside of the electronic device 1 is referred to as a second state. In this state, the camera module 400 may perform photographing. Therefore, the second state may also be understood as a working state of the camera module 400. The camera module 400 may switch between the first state and the second state when driven by a motor. When the camera module 400 is in the first state, the height of the camera module 400 is small. Therefore, when the camera module 400 is completely disposed inside the electronic device 1, a thinning design of the electronic device 1 is not limited. When the camera module 400 is in the second state, the height of the camera module 400 increases. In this case, positions of some or all lenses in the optical lens 410 may be adjusted in a height direction (that is, a z direction) of the camera module 400 to perform focusing or zooming, to achieve good photographing effect.

In embodiments of this application, the optical lens 410 is designed based on the pop-up camera module 400. The optical lens 410 has a small total track length when the camera module 400 is in the first state, and has a long back focus length when the camera module 400 is in the second state. Therefore, this facilitates a focusing or zoom operation of the camera module 400. In addition, the optical lens uses a variable aperture structure, and a design matching a related parameter of the lens is combined, so that the optical lens can provide different depth of field ranges for different scenes, and therefore meet photographing requirements of a plurality of scenes.

Figure 4:
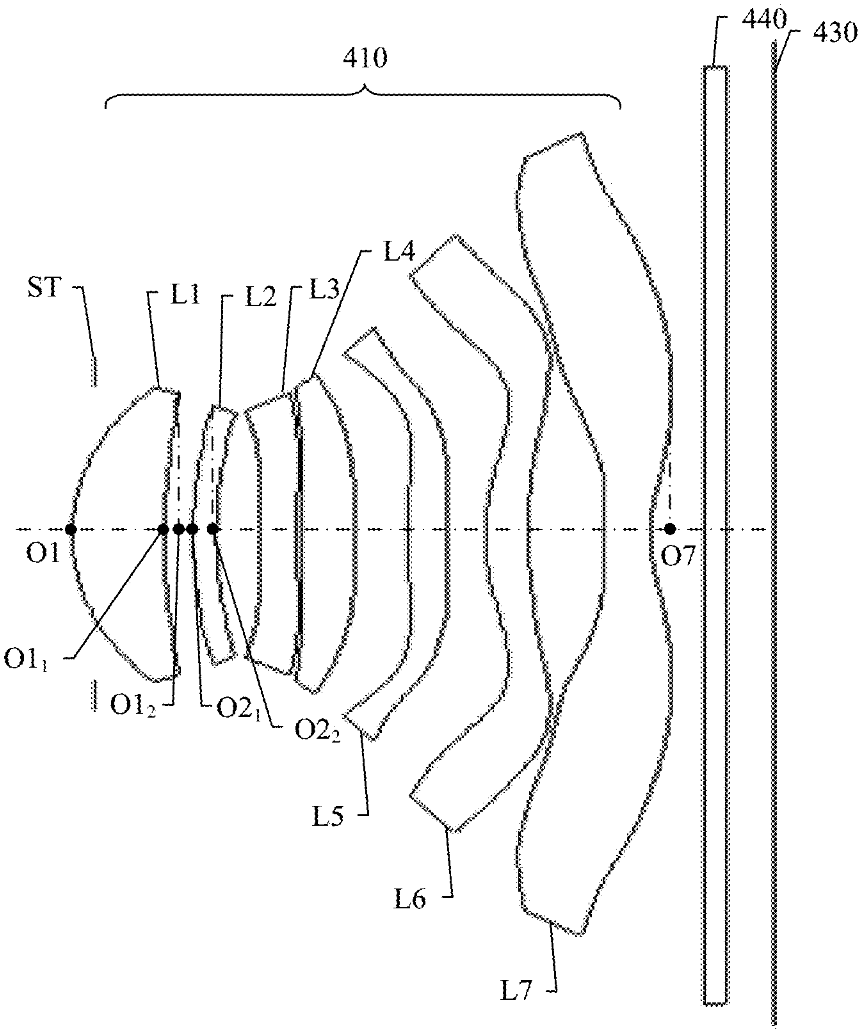
FIG. 4 is a schematic diagram of a reference structure of an optical lens according to an embodiment of this application.

FIG. 4 is a schematic diagram of a reference structure of an optical lens according to an embodiment of this application. The optical lens 410 may include a plurality of lenses with a focal power. For example, there may be at least seven lenses, for example, seven, eight, nine, or more lenses. This is not specifically limited in this application. In the embodiment shown in FIG. 4, an example in which the optical lens 410 includes seven lenses is used for description. In this case, from an object side to an image side, the seven lenses of the optical lens 410 may be respectively a first lens L1, a second lens L2, a third lens L3, a fourth lens L4, a fifth lens L5, a sixth lens L6, and a seventh lens L7. During specific implementation, these lenses may be aspheric lenses. In this way, an aberration can be eliminated, and imaging quality of the optical lens 410 can be improved. In this case, each lens may be made of a plastic material, to reduce manufacturing process difficulty and manufacturing costs of the optical lens 410. Certainly, in some other embodiments, each lens may alternatively be made of glass. Alternatively, some lenses are made of glass, and some lenses are made of plastic. Specific selection may be performed based on actual application. This is not limited in this application.

In some embodiments, the optical lens 410 may further include a variable aperture ST, where the variable aperture ST may be disposed on the object side of the plurality of lenses, and an aperture diameter of the variable aperture ST is adjustable. It may be understood that an amount of light admitted by the optical lens 410 may be adjusted by adjusting the aperture diameter of the variable aperture ST, and an F-number F of the optical lens 410 may be adjusted, to adjust the depth of field of the optical lens 410. During specific implementation, the variable aperture ST may use a "cat-eye" aperture, an "iris" aperture, an instantaneous aperture, a shutter aperture, or the like. This is not limited in this application.

Among the lenses of the optical lens 410, the first lens arranged in a direction from the object side to the image side, namely, the first lens L1 in FIG. 4, may have a positive focal power, an object side surface that is of the first lens L1 and that is near an optical axis is a convex surface, an image side surface that is of the first lens L1 and that is near the optical axis is a concave surface, and a focal length f1 of the first lens L1 and the focal length EFL of the optical lens 410 satisfy: $f1/EFL \leq 1.3$. The optical lens can achieve good imaging quality through reasonable allocation of the focal power. In addition, an Abbe coefficient vd1 of the first lens L1 may satisfy: $vd1 \geq 60$.

The second lens arranged in the direction from the object side to the image side, namely, the second lens L2 in FIG. 4, may have a high refractive index. This helps correct the aberration of the optical lens and also helps reduce the total track length of the optical lens 410. For example, a refractive index n2 of the second lens L2 satisfies: 1.6En2≤2.1. An Abbe coefficient vd2 of the second lens L2 and the Abbe coefficient vd1 of the first lens L1 satisfy: $|vd1-vd2| \geq 40$. A chromatic aberration of the optical lens can be reduced, and image quality of the optical lens can be improved through reasonable allocation of system material distribution.

An intersection point of the image side surface of the first lens L1 and the optical axis of the optical lens 410 is defined as $O1_1$, a projection point of an edge of the image side surface of the first lens L1 on the optical axis is defined as $O1_2$, a distance between $O1_1$ and $O1_2$ is sag1, an intersection point of an object side surface of the second lens L2 and the optical axis is defined as $O2_1$, a projection point of an edge of the object side surface of the second lens L2 on the optical axis is defined as $O2_2$, and a distance between $O2_1$ and $O2_2$ is sag2. In an extension direction of the optical axis, a distance between the image side surface of the first lens L1 and the object side surface of the second lens L2 is T12, and when sag1, sag2, and T12 satisfy: $T12-sag1+sag2 \geq 0.35$ mm, structural space for optical lens coupling can be provided, and the imaging quality of the optical lens can be improved. It should be noted that, the edge of the image side surface of the first lens L1 may also be understood as a position in which the image side surface of the first lens L1 has a maximum optically effective aperture. Similarly, the edge of the object side surface of the second lens L2 may also be understood as a position in which the object side surface of the second lens L2 has a maximum optically effective aperture.

In addition, a center thickness CT2 and an edge thickness ET2 of the second lens L2 may satisfy: $0.8 \leq CT2/ET2 \leq 1.1$. The center thickness of the lens may be understood as a thickness of a central position of the lens, that is, a thickness of a position in which the optical axis passes through the lens, and the edge thickness may be understood as a thickness of an edge position of the lens. This design can ensure processability of the second lens L2, and increase a yield of the optical lens.

For a penultimate lens arranged in the direction from the object side to the image side, namely, the sixth lens L6 in FIG. 4, an object side surface near the optical axis is a convex surface, an image side surface near the optical axis is a concave surface, and at least one surface in the object side surface and the image side surface of the sixth lens L6 may be a reversely curved surface. This helps improve image quality of an edge field of view of the camera module. The reversely curved surface may be understood as a composite curved surface formed by curved surfaces with opposite protrusion directions. The object side surface of the sixth lens L6 is used as an example. A central area of the sixth lens L6 protrudes toward an object side direction, and an edge area of the sixth lens L6 protrudes toward an image side direction.

A last lens arranged in the direction from the object side to the image side, namely, the seventh lens L7 in FIG. 4, has a negative focal power. At least one reversely curved surface may also exist in an object side surface and an image side surface of the seventh lens L7, to further improve the image quality of the edge field of view of the camera module.

In the direction from the object side to the image side, a point that is of the object side surface of the first lens (the first lens L1) and that is farthest away from an imaging surface in projection points of the optical axis is defined as O1, a point that is of the image side surface of the last lens (the seventh lens L7) and that is closest to the imaging surface in the projection points of the optical axis is defined as Ox (O7), and a distance TTL1 between O1 and O7 and an image height IH that can be formed by the optical lens 410 on the imaging surface of the optical lens 410 satisfy: $TTL1/IH \leq 0.57$.

A back focal length BFL of the optical lens 410 satisfies: $BFL \leq 2.5$ mm. It should be noted that the back focal length BFL herein is a distance between the seventh lens L7 and the photosensitive chip 430 when the camera module is in a pop-up state. In addition, the back focal length BFL of the optical lens 410 and the total track length TTL of the optical lens 410 may satisfy: $5 \leq TTL/BFL \leq 8$.

An entrance pupil diameter EPD of the optical lens 410 and a half-image height ImgH that can be formed by the optical lens 410 on the imaging surface of the optical lens 410 satisfy: 0.5≤EPD/ImgH≤0.8. Under this condition, a large aperture design can be implemented for the optical lens 410, thereby increasing the amount of light admitted by the optical lens 410. This helps the camera module implement core functions such as night scene photographing, snapshot taking, video recording, and background blurring.

A maximum entrance pupil diameter EPDmax and a minimum entrance pupil diameter EPDmin of the optical lens 410 and the focal length EFL of the optical lens 410 satisfy: 1.6≤EFL/(EPDmax−EPDmin)≤3.

The focal length EFL of the optical lens 410 and a maximum half-field of view HFOV of the optical lens 410 satisfy: EFL×tan (HFOV)≥7 mm. In this design, the camera module can have a large optical format, thereby improving the imaging brightness and the resolution.

The total track length TTL of the optical lens 410, the image height IH that can be formed by the optical lens 410 on the imaging surface of the optical lens 410, and the F-number F # of the optical lens 410 satisfy: $IH^2/(TTL^2 \times F\#) \geq 1.2$.

The F-number F # of the optical lens 410 and the image height IH that can be formed by the optical lens 410 on the imaging surface of the optical lens 410 satisfy: IH/(4×F #)≥1.85.

In addition, it should be noted that the optical lens 410 in embodiments of this application may adjust the F-number F # by changing the aperture diameter of the variable aperture ST. Different aperture diameters correspond to different F-number F #, that is, correspond to different depths of field. Therefore, the optical lens 410 can adapt to different photographing scenes. For example, when the aperture diameter of the variable aperture ST is large, the F-number F # of the optical lens 410 is small, and the optical lens 410 has a large aperture characteristic. Therefore, the depth of field can be made small, and a focus can be clear, but another scene that is not within a depth of field range is blurred, to highlight a subject and simplify an image. In addition, the large aperture is used, so that the light admitted by optical lens 410 per unit time increases. When exposure of the image is unchanged, a shutter speed can be increased in a large aperture mode, and when handheld photographing is performed when the light is insufficient or in a dark environment, the increase of the shutter speed can reduce impact of hand jitter on image definition, thereby helping the camera module photograph a night scene image with good effect. When the aperture diameter of the variable aperture ST is small, the F-number F # of the optical lens 410 is large, and the optical lens 410 has a small aperture characteristic. Therefore, a large depth of field can be obtained, and a background or a foreground other than a focused subject can be kept clear. In addition, the small aperture can reduce the amount of light admitted by the optical lens 410, so that the shutter speed can be slowed down, and a moving object can leave a moving trace on the image. Therefore, the optical lens 410 can further photograph scenes such as running water, a vehicle track, a star track, and light painting in a small aperture mode.

It can be learned from the foregoing description that the optical lens 410 in embodiments of this application has the long back focus length when the camera module is in the pop-up state. Therefore, this facilitates the focusing or zoom operation of the camera module, and helps the camera module achieve good photographing effect. In addition, the optical lens 410 uses the variable aperture structure design, so that the optical lens 410 can provide the different depth of field ranges for the different scenes, and can therefore meet the photographing requirements of the plurality of scenes. In addition, the photosensitive chip 430 with the large optical format is disposed in the optical lens 410. This can achieve good optical quality, and further help improve the imaging quality of the camera module.

The following describes imaging effect of the optical lens 410 in detail with reference to a specific embodiment.

Figure 5:
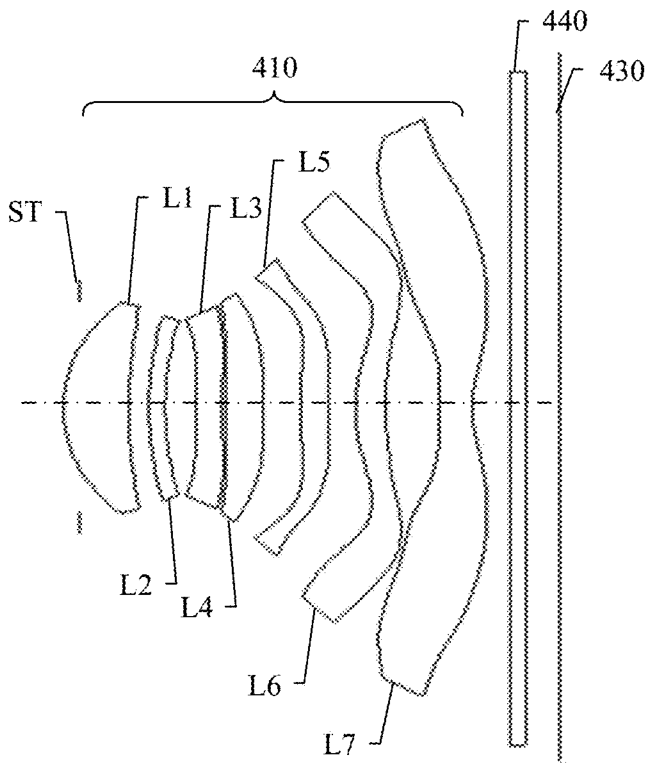
FIG. 5 is a schematic diagram of a structure of a first optical lens according to an embodiment of this application.

FIG. 5 is a schematic diagram of a structure of a first optical lens according to an embodiment of this application. The optical lens 410 includes a variable aperture ST and seven lenses with a focal power. The seven lenses are respectively a first lens L1, a second lens L2, a third lens L3, a fourth lens L4, a fifth lens L5, a sixth lens L6, and a seventh lens L7. The variable aperture ST is located on an object side of the first lens L1. In addition, a light filter 440 of a camera module is located on an image side of the seventh lens L7, and a photosensitive chip 430 is located on an image side of the light filter 440.

In this embodiment, a distance between a point that is of an object side surface of the first lens L1 and that is farthest away from an imaging surface in projection points of an optical axis and a point that is of an image side surface of the seventh lens L7 and that is closest to the imaging surface in the projection points of the optical axis is TTL1, and TTL1 and an image height IH that can be formed by the optical lens 410 on the imaging surface of the optical lens 410 satisfy: TTL1/IH=0.49.

The first lens L1 has a positive focal power, and a focal length f1 of the first lens L1 and a focal length EFL of the optical lens 410 satisfy: f1/EFL=1.26.

The second lens L2 has a positive focal power, and a focal length f2 of the second lens L2 and the focal length EFL of the optical lens 410 satisfy: f2/EFL=282, and a refractive index n2 of the second lens L2 is 2.011.

An Abbe coefficient vd1 of the first lens L1 and an Abbe coefficient vd2 of the second lens L2 satisfy: vd1−vd2=75.8.

The third lens L3 has a negative focal power.

The fourth lens L4 has a positive focal power.

A focal length f3 of the third lens L3, a focal length f4 of the fourth lens L4, and the focal length EFL of the optical lens 410 satisfy: EFL×(f3+f4)/(f3−f4)=−0.43095.

The fifth lens L5 has a positive focal power, and a focal length f5 of the fifth lens L5 and the focal length EFL of the optical lens 410 satisfy: f5/EFL=7.57.

The sixth lens L6 has a positive focal power, and a focal length f6 of the sixth lens L6 and the focal length EFL of the optical lens 410 satisfy: f6/EFL=1.3.

The seventh lens L7 has a negative focal power, and a focal length f7 of the seventh lens L7 and the focal length EFL of the optical lens 410 satisfy: f7/EFL=−0.72.

For other design parameters of the optical lens 410, refer to Table 1.

TABLE 1

| | |
|---|---|
| Focal length EFL | 8.27 mm |
| F-number | 1.6 |
| Half-field of view HFOV | 44.72° |
| Image height IH | 16.84 mm |
| Total track length TTL of an optical lens | 9.96 mm |
| Designed wavelength | 650 nm, 610 nm, 555 nm, 510 nm, 470 nm |

In this embodiment of this application, the lenses of the optical lens 410 may all be aspheric lenses, that is, the optical lens 410 includes 14 aspheric surfaces in total. Refer to both Table 2 and Table 3. Table 2 shows curvature radii, thicknesses, refractive indexes, and Abbe coefficients of the lenses in the optical lens 410, and Table 3 shows aspheric coefficients of the lenses.

It should be noted that in Table 2 and Table 3 and attached tables of the following embodiments, S1 and S2 respectively indicate the object side surface and an image side surface of the first lens L1, S3 and S4 respectively indicate an object side surface and an image side surface of the second lens L2, S5 and S6 respectively indicate an object side surface and an image side surface of the third lens L3, S7 and S8 respectively indicate an object side surface and an image side surface of the fourth lens L4, S9 and S10 respectively indicate an object side surface and an image side surface of the fifth lens L5, S11 and S12 respectively indicate an object side surface and an image side surface of the sixth lens L6, S13 and S14 respectively indicate an object side surface and the image side surface of the seventh lens L7, and S15 and S16 respectively indicate an object side surface and an image side surface of the light filter 440.

T01 indicates a distance between the variable aperture ST and the object side surface of the first lens L1, and when TO1 is a negative value, it may be understood that there is an overlapping area between the variable aperture ST and the first lens L1 in an extension direction of the optical axis. In other words, the object side surface of the first lens L1 may partially extend into a light passing hole of the variable aperture ST. T12 indicates a distance between the image side surface of the first lens L1 and the object side surface of the second lens L2, T23 indicates a distance between the image side surface of the second lens L2 and the object side surface of the third lens L3, T34 indicates a distance between the image side surface of the third lens L3 and the object side surface of the fourth lens L4, T45 indicates a distance between the image side surface of the fourth lens L4 and the object side surface of the fifth lens L5, T56 indicates a distance between the image side surface of the fifth lens L5 and the object side surface of the sixth lens L6, T67 indicates a distance between the image side surface of the sixth lens L6 and the object side surface of the seventh lens L7, T78 indicates a distance between the image side surface of the seventh lens L7 and the object side surface of the light filter 440, and T89 indicates a distance between the image side surface of the light filter 440 and the imaging surface.

CT1, CT2, CT3, CT4, CT5, CT6, and CT7 respectively indicate center thicknesses of the first lens L1, the second lens L2, the third lens L3, the fourth lens L4, the fifth lens L5, the sixth lens L6, and the seventh lens L7. CT8 indicates a thickness of the light filter 440.

n1, n2, n3, n4, n5, n6, and n7 respectively indicate refractive indexes of the first lens L1, the second lens L2, the third lens L3, the fourth lens L4, the fifth lens L5, the sixth lens L6, and the seventh lens L7. n8 indicates a refractive index of the light filter 440.

vd1, vd2, vd3, vd4, vd5, vd6, and vd7 respectively indicate Abbe coefficients of the first lens L1, the second lens L2, the third lens L3, the fourth lens L4, the fifth lens L5, the sixth lens L6, and the seventh lens L7. vd8 indicates an Abbe coefficient of the light filter 440.

TABLE 2

| | Description | Curvature radius | Thickness/Distance | | Refractive index | | Abbe coefficient | |
|---|---|---|---|---|---|---|---|---|
| ST | Variable aperture | — | T01 | −0.1 | | — | | — |
| S1 | First lens | 3.278892 | CT1 | 1.301774 | n1 | 1.437842 | vd1 | 95.09901 |
| S2 | | 10.13062 | T12 | 0.41 | | | | |
| S3 | Second lens | 7.557703 | CT2 | 0.330508 | n2 | 2.011039 | vd2 | 19.32462 |
| S4 | | 7.415314 | T23 | 0.629731 | | | | |
| S5 | Third lens | −63.8984 | CT3 | 0.517243 | n3 | 1.677569 | vd3 | 19.24591 |
| S6 | | 21.78614 | T34 | 0.070213 | | | | |
| S7 | Fourth lens | 19.00463 | CT4 | 0.74845 | n4 | 1.545869 | vd4 | 56.1354 |
| S8 | | −60.1617 | T45 | 0.752645 | | | | |
| S9 | Fifth lens | 10.57399 | CT5 | 0.554118 | n5 | 1.570378 | vd5 | 37.31465 |
| S10 | | 14.73078 | T56 | 0.548859 | | | | |
| S11 | Sixth lens | 4.536012 | CT6 | 0.602287 | n6 | 1.545869 | vd6 | 56.1354 |
| S12 | | 18.96807 | T67 | 1.066495 | | | | |
| S13 | Seventh | 16.31201 | CT7 | 0.668266 | n7 | 1.545869 | vd7 | 56.1354 |
| S14 | lens | 2.681076 | T78 | 0.762696 | | | | |
| S15 | Light filter | — | CT8 | 0.30999 | n8 | 1.518274 | vd8 | 64.16641 |
| S16 | | — | T89 | 0.762696 | | | | |
| | Imaging surface | — | — | 0 | — | — | — | — |

TABLE 3

| | Type | K | A2 | A4 | A6 | A8 | A10 | A12 | A14 |
|---|---|---|---|---|---|---|---|---|---|
| S1 | Extended aspheric surface | 7.65E−05 | 0.00E+00 | −7.69E−04 | 1.17E−03 | −1.24E−03 | 7.99E−04 | −3.19E−04 | 7.94E−05 |
| S2 | Extended aspheric surface | 5.26E−02 | 0.00E+00 | −2.51E−03 | −4.48E−05 | 3.57E−04 | −3.77E−04 | 2.00E−04 | −6.07E−05 |
| S3 | Extended aspheric surface | −1.91E−02 | 0.00E+00 | −5.13E−03 | 1.56E−03 | −2.27E−03 | 2.16E−03 | −1.18E−03 | 3.96E−04 |
| S4 | Extended aspheric surface | −4.18E−02 | 0.00E+00 | −3.76E−03 | 9.67E−04 | −9.97E−04 | 7.48E−04 | −2.76E−04 | 4.52E−05 |
| S5 | Extended aspheric surface | −9.80E+01 | 0.00E+00 | −4.20E−03 | −7.80E−03 | 2.74E−02 | −5.77E−02 | 7.42E−02 | −6.28E−02 |
| S6 | Extended aspheric surface | 3.56E+01 | 0.00E+00 | −1.98E−02 | 2.85E−02 | −3.41E−02 | 2.52E−02 | −1.21E−02 | 3.85E−03 |
| S7 | Extended aspheric surface | −6.77E−01 | 0.00E+00 | −2.89E−02 | 4.06E−02 | −5.31E−02 | −5.02E−02 | −3.61E−02 | 2.01E−02 |

TABLE 3-continued

| | | | | | | | | | |
|---|---|---|---|---|---|---|---|---|---|
| S8 | Extended aspheric surface | 9.80E+01 | 0.00E+00 | −1.24E−02 | −3.05E−03 | 1.07E−02 | −1.39E−02 | 1.09E−02 | −5.73E−03 |
| S9 | Extended aspheric surface | −1.15E+01 | 0.00E+00 | −1.78E−02 | 4.78E−03 | −4.41E−03 | 4.42E−03 | −3.20E−03 | 1.60E−03 |
| S10 | Extended aspheric surface | 4.31E+00 | 0.00E+00 | −2.43E−02 | −3.20E−04 | 1.94E−03 | −1.05E−03 | 4.88E−04 | −2.09E−04 |
| S11 | Extended aspheric surface | −2.69E−02 | 0.00E+00 | 5.33E−03 | −7.73E−03 | 2.05E−03 | −4.68E−04 | 8.93E−05 | −1.20E−05 |
| S12 | Extended aspheric surface | 4.13E+00 | 0.00E+00 | 2.20E−02 | −5.46E−03 | −3.67E−04 | 4.45E−04 | −1.06E−04 | 1.31E−05 |
| S13 | Extended aspheric surface | −4.78E−02 | 0.00E+00 | −5.14E−02 | 1.05E−02 | −1.78E−03 | 3.17E−04 | −4.36E−05 | 4.02E−06 |
| S14 | Extended aspheric surface | −1.00E+00 | 0.00E+00 | −5.90E−02 | 1.41E−02 | −2.71E−03 | 3.96E−04 | −4.23E−05 | 3.25E−06 |

| | Type | A16 | A18 | A20 | A22 | A24 | A26 | A28 | A30 |
|---|---|---|---|---|---|---|---|---|---|
| S1 | Extended aspheric surface | −1.21E−05 | 1.02E−06 | −3.70E−08 | 0.00E+00 | 0.00E+00 | 0.00E+00 | 0.00E+00 | 0.00E+00 |
| S2 | Extended aspheric surface | 1.05E−05 | −9.50E−07 | 3.48E−08 | 0.00E+00 | 0.00E+00 | 0.00E+00 | 0.00E+00 | 0.00E+00 |
| S3 | Extended aspheric surface | −7.93E−05 | 8.74E−06 | −4.07E−07 | 0.00E+00 | 0.00E+00 | 0.00E+00 | 0.00E+00 | 0.00E+00 |
| S4 | Extended aspheric surface | 1.66E−06 | −1.58E−06 | 1.59E−07 | 0.00E+00 | 0.00E+00 | 0.00E+00 | 0.00E+00 | 0.00E+00 |
| S5 | Extended aspheric surface | 3.65E−02 | −1.48E−02 | 4.16E−03 | −8.03E−04 | 1.01E−04 | −7.44E−06 | 2.45E−07 | 0.00E+00 |
| S6 | Extended aspheric surface | −8.03E−04 | 1.05E−04 | −7.76E−06 | 2.48E−07 | 0.00E+00 | 0.00E+00 | 0.00E+00 | 0.00E+00 |
| S7 | Extended aspheric surface | −8.60E−03 | 2.78E−03 | −6.67E−04 | 1.15E−04 | −1.39E−05 | 1.11E−06 | −5.24E−08 | 1.11E−09 |
| S8 | Extended aspheric surface | 2.09E−03 | −5.38E−04 | 9.71E−05 | −1.20E−05 | 9.75E−07 | −4.64E−08 | 9.83E−10 | 0.00E+00 |
| S9 | Extended aspheric surface | −5.65E−04 | 1.45E−04 | −2.72E−05 | 3.67E−06 | −3.47E−07 | 2.17E−08 | −8.06E−10 | 1.34E−11 |
| S10 | Extended aspheric surface | 6.85E−05 | −1.57E−05 | 2.49E−06 | −2.69E−07 | 1.95E−08 | −9.02E−10 | 2.42E−11 | −2.86E−13 |
| S11 | Extended aspheric surface | 7.78E−07 | 3.13E−08 | −1.10E−08 | 1.01E−09 | −5.06E−11 | 1.48E−12 | −2.35E−14 | 1.58E−16 |
| S12 | Extended aspheric surface | −8.62E−07 | 1.33E−08 | 2.61E−09 | −2.46E−10 | 1.09E−11 | −2.76E−13 | 3.84E−15 | −2.28E−17 |
| S13 | Extended aspheric surface | −2.52E−07 | 1.09E−08 | −3.33E−10 | 7.14E−12 | −1.05E−13 | 1.01E−15 | −5.66E−18 | 1.41E−20 |
| S14 | Extended aspheric surface | −1.80E−07 | 7.17E−09 | −2.07E−10 | 4.26E−12 | −6.13E−14 | 5.83E−16 | −3.31E−18 | 8.47E−21 |

In the 14 aspheric surfaces of the optical lens 410 shown in Table 3, a surface type z of each of the even extended aspheric surfaces may be defined by, including but not limited to, the following aspheric surface formula:

$$z = \frac{cr^2}{1 + \sqrt{1 - (K+1)c^2r^2}} + \sum_i Air^i$$

where z is a vector height of the aspheric surface, r is a radial coordinate of the aspheric surface, c is a spherical curvature of a vertex on the aspheric surface, K is a quadric surface constant, and Ai indicates an $i^{th}$-order aspheric surface coefficient.

Simulation is performed on the optical lens 410 shown in FIG. 5, and a simulation result is described in detail below with reference to the accompanying drawings.

Figure 6:
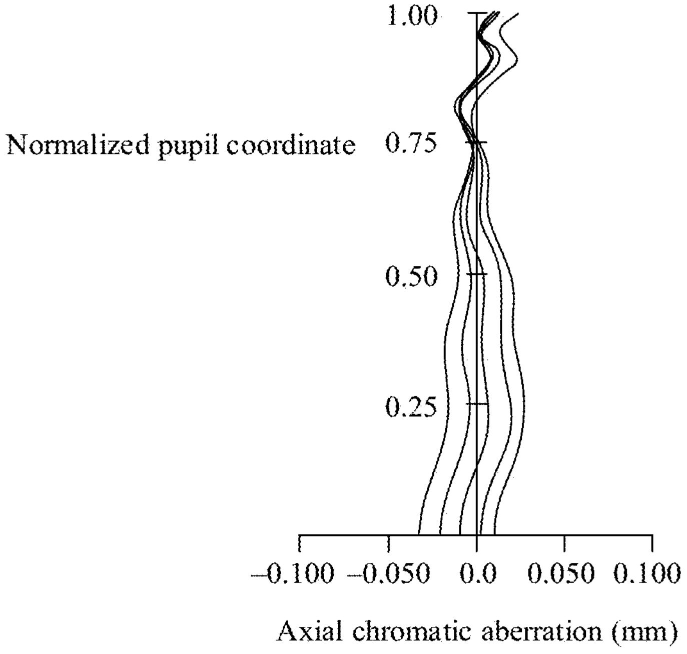
FIG. 6 is a curve diagram of an axial chromatic aberration of a first optical lens according to an embodiment of this application.

FIG. 6 is a curve diagram of an axial chromatic aberration of the first optical lens according to this embodiment of this application. Simulation results of depth of focus locations for color light of wavelengths of 650 nm, 610 nm, 555 nm, 510 nm, and 470 nm are separately shown in the figure. It can be seen that the axial chromatic aberration of the optical lens 410 can be controlled within a very small range.

Figure 7:
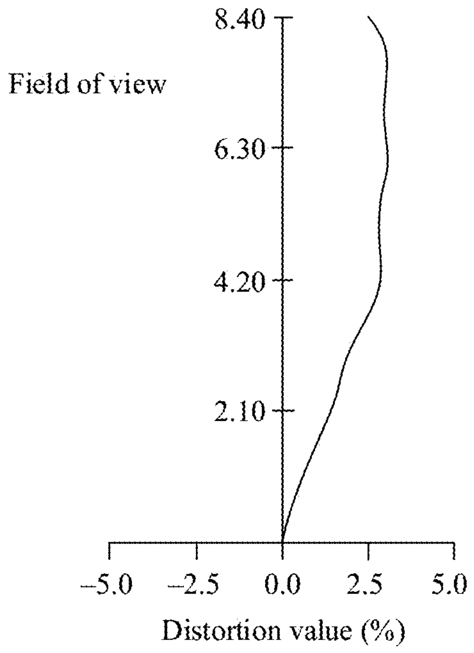
FIG. 7 is a curve diagram of optical distortion of a first optical lens according to an embodiment of this application.

FIG. 7 is a curve diagram of optical distortion of the first optical lens according to this embodiment of this application, and reflects deformation differences between actual imaging shapes and ideal shapes in different fields of view. It can be learned that the optical lens 410 can basically control the optical distortion within 3%.

Figure 8:
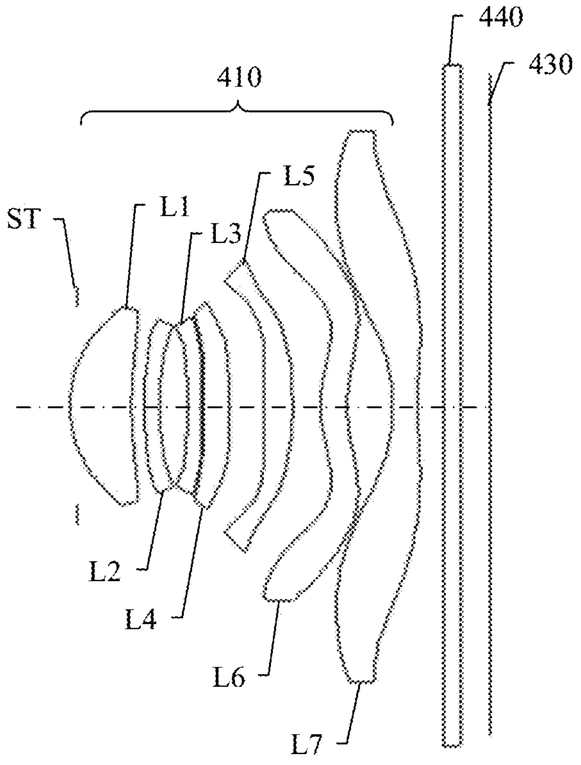
FIG. 8 is a schematic diagram of a structure of a second optical lens according to an embodiment of this application.

FIG. 8 is a schematic diagram of a structure of a second optical lens according to an embodiment of this application. The optical lens 410 includes a variable aperture ST and seven lenses with a focal power. The seven lenses are respectively a first lens L1, a second lens L2, a third lens L3, a fourth lens L4, a fifth lens L5, a sixth lens L6, and a seventh lens L7. The variable aperture ST is located on an object side of the first lens L1. In addition, a light filter 440 of a camera module is located on an image side of the seventh lens L7, and a photosensitive chip 430 is located on an image side of the light filter 440.

In this embodiment, a distance between a point that is of an object side surface of the first lens L1 and that is farthest away from an imaging surface in projection points of an optical axis and a point that is of an image side surface of the seventh lens L7 and that is closest to the imaging surface in the projection points of the optical axis is TTL1, and TTL1 and an image height IH that can be formed by the optical lens 410 on the imaging surface of the optical lens 410 satisfy: TTL1/IH=0.505.

The first lens L1 has a positive focal power, and a focal length f1 of the first lens L1 and a focal length EFL of the optical lens 410 satisfy: f1/EFL=1.125.

The second lens L2 has a negative focal power, and a focal length f2 of the second lens L2 and the focal length EFL of the optical lens 410 satisfy: f2/EFL=−13.9, and a refractive index n2 of the second lens L2 is 1.677.

An Abbe coefficient vd1 of the first lens L1 and an Abbe coefficient vd2 of the second lens L2 satisfy: vd1−vd2=75.8.

The third lens L3 has a negative focal power.

The fourth lens L4 has a positive focal power.

A focal length f3 of the third lens L3, a focal length f4 of the fourth lens L4, and the focal length EFL of the optical lens 410 satisfy: EFL×(f3+f4)/(f3−f4)=−0.74464.

The fifth lens L5 has a positive focal power, and a focal length f5 of the fifth lens L5 and the focal length EFL of the optical lens 410 satisfy: f5/EFL=2.6972.

The sixth lens L6 has a positive focal power, and a focal length f6 of the sixth lens L6 and the focal length EFL of the optical lens 410 satisfy: f6/EFL=2.847.

The seventh lens L7 has a negative focal power, and a focal length f7 of the seventh lens L7 and the focal length EFL of the optical lens 410 satisfy: f7/EFL=−0.881.

For other design parameters of the optical lens 410, refer to Table 4.

TABLE 4

| | |
|---|---|
| Focal length EFL | 8.468 mm |
| F-number | 1.6 |
| Half-field of view HFOV | 43.95° |
| Image height IH | 16.8 mm |
| Total track length TTL of an optical lens | 9.868 mm |
| Designed wavelength | 650 nm, 610 nm, 555 nm, 510 nm, 470 nm |

In this embodiment of this application, the lenses of the optical lens 410 may all be aspheric lenses, that is, the optical lens 410 includes 14 aspheric surfaces in total. Refer to both Table 5 and Table 6. Table 5 shows curvature radii, thicknesses, refractive indexes, and Abbe coefficients of the lenses in the optical lens 410, and Table 6 shows aspheric coefficients of the lenses.

TABLE 5

| | Description | Curvature radius | Thickness/Distance | | Refractive index | | Abbe coefficient |
|---|---|---|---|---|---|---|---|
| ST | Variable aperture | — | T01 | −0.18 | — | | — |
| S1 | First lens | 3.1121 | CT1 | 1.442725 n1 | 1.437842 | vd1 | 95.09901 |
| S2 | | 10.50712 | T12 | 0.297478 | | | |
| S3 | Second lens | 7.860673 | CT2 | 0.35962 n2 | 1.677569 | vd2 | 19.24591 |
| S4 | | 7.022413 | T23 | 0.66317 | | | |
| S5 | Third lens | −25.8806 | CT3 | 0.313073 n3 | 1.677569 | vd3 | 19.24591 |
| S6 | | 42.28828 | T34 | 0.044987 | | | |
| S7 | Fourth lens | 13.13932 | CT4 | 0.61 n4 | 1.545869 | vd4 | 56.1354 |
| S8 | | 87.08052 | T45 | 0.827255 | | | |
| S9 | Fifth lens | −401.96 | CT5 | 0.666249 n5 | 1.570378 | vd5 | 37.31465 |
| S10 | | −12.6182 | T56 | 0.657255 | | | |
| S11 | Sixth lens | 3.062146 | CT6 | 0.624064 n6 | 1.545869 | vd6 | 56.1354 |
| S12 | | 3.703754 | T67 | 1.045675 | | | |
| S13 | Seventh lens | −10.0166 | CT7 | 0.597252 n7 | 1.545869 | vd7 | 56.1354 |
| S14 | | 7.005114 | T78 | 0.613046 | | | |
| S15 | Light filter | — | CT8 | 0.41205 n8 | 1.518274 | vd8 | 64.16641 |
| S16 | | — | T89 | 0.694828 | | | |
| | Imaging surface | — | — | 0 — | — | — | — |

TABLE 6

| | Type | K | A2 | A4 | A6 | A8 | A10 | A12 | A14 |
|---|---|---|---|---|---|---|---|---|---|
| S1 | Extended aspheric surface | −5.47E−02 | 0.00E+00 | −6.50E−04 | 1.24E−03 | −1.41E−03 | 9.65E−04 | −4.07E−04 | 1.07E−04 |
| S2 | Extended aspheric surface | −2.63E+01 | 0.00E+00 | −2.09E−03 | −2.40E−05 | 1.58E−04 | −1.38E−04 | 8.37E−05 | −3.02E−05 |
| S3 | Extended aspheric surface | 5.76E−04 | 0.00E+00 | −8.12E−03 | −2.64E−03 | 1.02E−02 | −1.89E−02 | 2.42E−02 | −2.17E−02 |
| S4 | Extended aspheric surface | −3.64E−03 | 0.00E+00 | −3.28E−03 | −8.28E−03 | 3.02E−02 | −6.64E−02 | 1.00E−01 | −1.06E−01 |
| S5 | Extended aspheric surface | −1.85E−01 | 0.00E+00 | −1.94E−03 | 1.50E−02 | −5.07E−02 | 7.71E−02 | −6.86E−02 | 3.28E−02 |
| S6 | Extended aspheric surface | −8.02E−01 | 0.00E+00 | −1.89E−02 | 4.88E−02 | −1.20E−01 | 1.71E−01 | −1.57E−01 | 9.87E−02 |
| S7 | Extended aspheric surface | −6.65E−03 | 0.00E+00 | −3.78E−02 | 5.14E−02 | −1.13E−01 | 1.54E−01 | −1.35E−01 | 8.16E−02 |
| S8 | Extended aspheric surface | 1.79E−07 | 0.00E+00 | −1.29E−02 | −5.10E−03 | 9.64E−03 | −1.43E−02 | 1.40E−02 | −9.16E−03 |
| S9 | Extended aspheric surface | 2.72E−08 | 0.00E+00 | −1.18E−03 | 1.77E−03 | −1.71E−03 | 3.23E−04 | 1.24E−04 | −9.73E−05 |
| S10 | Extended aspheric surface | −4.32E−03 | 0.00E+00 | −2.07E−02 | 1.23E−02 | −5.50E−03 | 1.61E−03 | −2.96E−04 | 2.06E−05 |
| S11 | Extended aspheric surface | −9.25E−01 | 0.00E+00 | −4.26E−02 | 1.02E−02 | −3.11E−03 | 7.60E−04 | −1.46E−04 | 2.10E−05 |
| S12 | Extended aspheric surface | −1.01E+00 | 0.00E+00 | −2.71E−02 | 3.79E−03 | −4.76E−04 | 1.01E−05 | 1.26E−05 | −3.54E−06 |
| S13 | Extended aspheric surface | 9.43E−01 | 0.00E+00 | −2.81E−02 | 5.90E−03 | −6.56E−04 | 5.57E−05 | −4.58E−06 | 3.63E−07 |

TABLE 6-continued

| | | | | | | | | | |
|---|---|---|---|---|---|---|---|---|---|
| S14 | Extended aspheric surface | −9.40E−02 | 0.00E+00 | −2.56E−02 | 4.98E−03 | −7.15E−04 | 7.52E−05 | −6.14E−06 | 4.08E−07 |

| | Type | A16 | A18 | A20 | A22 | A24 | A26 | A28 | A30 |
|---|---|---|---|---|---|---|---|---|---|
| S1 | Extended aspheric surface | −1.71E−05 | 1.53E−06 | −5.87E−08 | 0.00E+00 | 0.00E+00 | 0.00E+00 | 0.00E+00 | 0.00E+00 |
| S2 | Extended aspheric surface | 6.03E−06 | −6.21E−07 | 2.52E−08 | 0.00E+00 | 0.00E+00 | 0.00E+00 | 0.00E+00 | 0.00E+00 |
| S3 | Extended aspheric surface | 1.39E−02 | −6.45E−03 | 2.16E−03 | −5.17E−04 | 8.60E−05 | −9.46E−06 | 6.17E−07 | −1.81E−08 |
| S4 | Extended aspheric surface | 7.97E−02 | −4.34E−02 | 1.71E−02 | −4.79E−03 | 9.38E−04 | −1.21E−04 | 9.34E−06 | −3.23E−07 |
| S5 | Extended aspheric surface | −2.02E−03 | −8.16E−03 | 5.94E−03 | −2.25E−03 | 5.27E−04 | −7.68E−05 | 6.42E−06 | −2.36E−07 |
| S6 | Extended aspheric surface | −4.36E−02 | 1.37E−02 | −3.02E−03 | 4.61E−04 | −4.60E−05 | 2.71E−06 | −7.11E−08 | 0.00E+00 |
| S7 | Extended aspheric surface | −3.46E−02 | 1.04E−02 | −2.22E−03 | 3.27E−04 | −3.16E−05 | 1.81E−06 | −4.63E−08 | 0.00E+00 |
| S8 | Extended aspheric surface | 4.13E−03 | −1.32E−03 | 2.99E−04 | −4.82E−05 | 5.37E−06 | −3.93E−07 | 1.70E−08 | −3.29E−10 |
| S9 | Extended aspheric surface | 2.79E−05 | −3.63E−06 | −8.05E−08 | 1.11E−07 | −1.89E−08 | 1.63E−09 | −7.41E−11 | 1.41E−12 |
| S10 | Extended aspheric surface | 5.08E−06 | −1.83E−06 | 2.92E−07 | −2.88E−08 | 1.83E−09 | −7.29E−11 | 1.66E−12 | −1.63E−14 |
| S11 | Extended aspheric surface | −2.26E−06 | 1.84E−07 | −1.15E−08 | 5.38E−10 | −1.83E−11 | 4.24E−13 | −5.92E−15 | 3.74E−17 |
| S12 | Extended aspheric surface | 5.52E−07 | −5.72E−08 | 4.11E−09 | −2.05E−10 | 6.96E−12 | −1.54E−13 | 2.00E−15 | −1.15E−17 |
| S13 | Extended aspheric surface | −2.35E−08 | 1.12E−09 | −3.78E−11 | 8.97E−13 | −1.46E−14 | 1.55E−16 | −9.73E−19 | 2.73E−21 |
| S14 | Extended aspheric surface | −2.20E−08 | 9.35E−10 | −3.01E−11 | 7.05E−13 | −1.16E−14 | 1.25E−16 | −7.94E−19 | 2.26E−21 |

In the 14 aspheric surfaces of the optical lens 410 shown in Table 6, a surface type z of each of the even extended aspheric surfaces may be defined by, including but not limited to, the following aspheric surface formula:

$$z = \frac{cr^2}{1 + \sqrt{1 - (K+1)c^2r^2}} + \sum_i Air^i$$

where z is a vector height of the aspheric surface, r is a radial coordinate of the aspheric surface, c is a spherical curvature of a vertex on the aspheric surface, K is a quadric surface constant, and Ai indicates an $i^{th}$-order aspheric surface coefficient.

Simulation is performed on the optical lens 410 shown in FIG. 8, and a simulation result is described in detail below with reference to the accompanying drawings.

Figure 9:
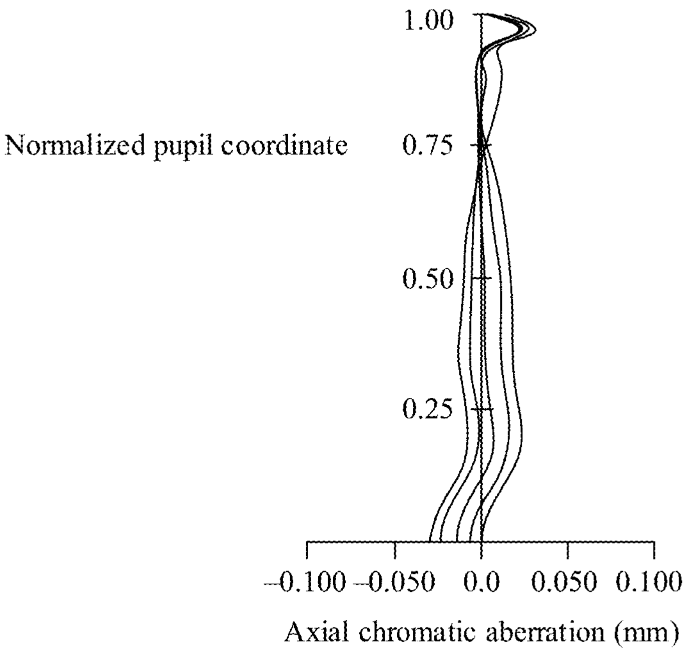
FIG. 9 is a curve diagram of an axial chromatic aberration of a second optical lens according to an embodiment of this application.

FIG. 9 is a curve diagram of an axial chromatic aberration of the second optical lens according to this embodiment of this application. Simulation results of depth of focus locations for color light of wavelengths of 650 nm, 610 nm, 555 nm, 510 nm, and 470 nm are separately shown in the figure. It can be seen that the axial chromatic aberration of the optical lens 410 can be controlled within a very small range.

Figure 10:
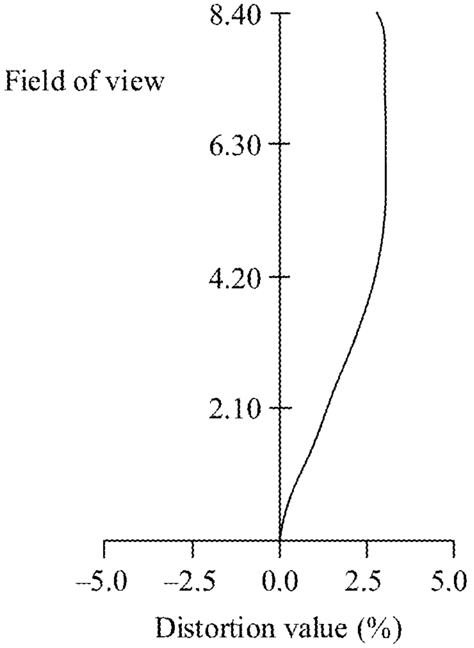
FIG. 10 is a curve diagram of optical distortion of a second optical lens according to an embodiment of this application.

FIG. 10 is a curve diagram of optical distortion of the second optical lens according to this embodiment of this application, and reflects deformation differences between actual imaging shapes and ideal shapes in different fields of view. It can be learned that the optical lens 410 can basically control the optical distortion within 3%.

Figure 11:
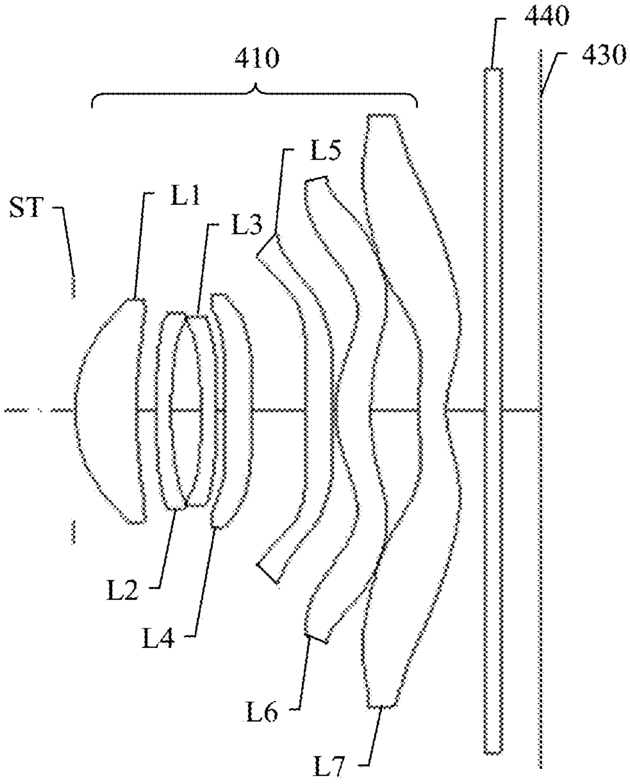
FIG. 11 is a schematic diagram of a structure of a third optical lens according to an embodiment of this application.

FIG. 11 is a schematic diagram of a structure of a third optical lens according to an embodiment of this application. The optical lens 410 includes a variable aperture ST and seven lenses with a focal power. The seven lenses are respectively a first lens L1, a second lens L2, a third lens L3, a fourth lens L4, a fifth lens L5, a sixth lens L6, and a seventh lens L7. The variable aperture ST is located on an object side of the first lens L1. In addition, a light filter 440 of a camera module is located on an image side of the seventh lens L7, and a photosensitive chip 430 is located on an image side of the light filter 440.

In this embodiment, a distance between a point that is of an object side surface of the first lens L1 and that is farthest away from an imaging surface in projection points of an optical axis and a point that is of an image side surface of the seventh lens L7 and that is closest to the imaging surface in the projection points of the optical axis is TTL1, and TTL1 and an image height IH that can be formed by the optical lens 410 on the imaging surface of the optical lens 410 satisfy: TTL1/IH=0.506.

The first lens L1 has a positive focal power, and a focal length f1 of the first lens L1 and a focal length EFL of the optical lens 410 satisfy: f1/EFL=1.036.

The second lens L2 has a negative focal power, and a focal length f2 of the second lens L2 and the focal length EFL of the optical lens 410 satisfy: f2/EFL=−5.24, and a refractive index n2 of the second lens L2 is 1.677.

An Abbe coefficient vd1 of the first lens L1 and an Abbe coefficient vd2 of the second lens L2 satisfy: vd1−vd2=62.32.

The third lens L3 has a negative focal power.

The fourth lens L4 has a positive focal power.

A focal length f3 of the third lens L3, a focal length f4 of the fourth lens L4, and the focal length EFL of the optical lens 410 satisfy: EFL×(f3+f4)/(f3−f4)=0.1578.

The fifth lens L5 has a negative focal power, and a focal length f5 of the fifth lens L5 and the focal length EFL of the optical lens 410 satisfy: f5/EFL=−1.519.

The sixth lens L6 has a positive focal power, and a focal length f6 of the sixth lens L6 and the focal length EFL of the optical lens 410 satisfy: f6/EFL=0.755.

The seventh lens L7 has a negative focal power, and a focal length f7 of the seventh lens L7 and the focal length EFL of the optical lens 410 satisfy: f7/EFL=−1.016.

For other design parameters of the optical lens 410, refer to Table 7.

TABLE 7

| | |
|---|---|
| Focal length EFL | 8.69 mm |
| F-number | 1.6 |
| Half-field of view HFOV | 42.84° |
| Image height IH | 16.6 mm |
| Total track length TTL of an optical lens | 10.184 mm |
| Designed wavelength | 650 nm, 610 nm, 555 nm, 510 nm, 470 nm |

In this embodiment of this application, the lenses of the optical lens 410 may all be aspheric lenses, that is, the optical lens 410 includes 14 aspheric surfaces in total. Refer to both Table 8 and Table 9. Table 8 shows curvature radii, thicknesses, refractive indexes, and Abbe coefficients of the lenses in the optical lens 410, and Table 9 shows aspheric coefficients of the lenses.

TABLE 8

| | Description | Curvature radius | Thickness/Distance | | Refractive index | | Abbe coefficient | |
|---|---|---|---|---|---|---|---|---|
| ST | Variable aperture | — | T01 | 0.03 | | — | | — |
| S1 | First lens | 3.305672 | CT1 | 1.335787 | n1 | 1.498217 | vd1 | 81.55838 |
| S2 | | 10.87642 | T12 | 0.427925 | | | | |
| S3 | Second lens | 13.24143 | CT2 | 0.333258 | n2 | 1.677569 | vd2 | 19.24591 |
| S4 | | 9.169823 | T23 | 0.644375 | | | | |
| S5 | Third lens | −19.6535 | CT3 | 0.332805 | n3 | 1.677569 | vd3 | 19.24591 |
| S6 | | −236.654 | T34 | 0.171799 | | | | |
| S7 | Fourth lens | 12.45229 | CT4 | 0.61 | n4 | 1.545869 | vd4 | 56.1354 |
| S8 | | 48.33812 | T45 | 1.18471 | | | | |
| S9 | Fifth lens | −25.2282 | CT5 | 0.578243 | n5 | 1.570378 | vd5 | 37.31465 |
| S10 | | 10.81449 | T56 | 0.067182 | | | | |
| S11 | Sixth lens | 2.547097 | CT6 | 0.768969 | n6 | 1.545869 | vd6 | 56.1354 |
| S12 | | 7.887664 | T67 | 1.040666 | | | | |
| S13 | Seventh lens | 4.971035 | CT7 | 0.605717 | n7 | 1.545869 | vd7 | 56.1354 |
| S14 | | 2.340956 | T78 | 0.858174 | | | | |
| S15 | Light filter | — | CT8 | 0.34 | n8 | 1.518274 | vd8 | 64.16641 |
| S16 | | — | T89 | 0.884239 | | | | |
| | Imaging surface | — | — | 0 | — | — | — | — |

TABLE 9

| | Type | K | A2 | A4 | A6 | A8 | A10 | A12 | A14 |
|---|---|---|---|---|---|---|---|---|---|
| S1 | Extended aspheric surface | 0.00E+00 | 0.00E+00 | −3.25E−04 | 7.35E−04 | −8.46E−04 | 6.00E−04 | −2.76E−04 | 8.35E−05 |
| S2 | Extended aspheric surface | 8.91E−02 | 0.00E+00 | −2.41E−03 | −5.83E−04 | 7.90E−04 | −6.11E−04 | 2.95E−04 | −8.85E−05 |
| S3 | Extended aspheric surface | −9.45E−02 | 0.00E+00 | −6.89E−03 | 1.95E−03 | −2.05E−03 | 3.00E−03 | −2.71E−03 | 1.68E−03 |
| S4 | Extended aspheric surface | 2.19E−02 | 0.00E+00 | −3.34E−03 | −2.46E−03 | 1.07E−02 | −1.95E−02 | 2.36E−02 | −1.98E−02 |
| S5 | Extended aspheric surface | 5.44E−01 | 0.00E+00 | −7.01E−03 | 8.09E−03 | −2.10E−02 | 3.08E−02 | −3.14E−02 | 2.28E−02 |
| S6 | Extended aspheric surface | −9.80E+01 | 0.00E+00 | −1.46E−02 | 7.54E−03 | −5.28E−03 | −1.99E−03 | 8.91E−03 | −1.02E−02 |
| S7 | Extended aspheric surface | −7.75E−01 | 0.00E+00 | −2.43E−02 | 6.71E−03 | −3.87E−03 | −1.60E−05 | 2.81E−03 | −2.96E−03 |
| S8 | Extended aspheric surface | 1.40E+01 | 0.00E+00 | −1.19E−02 | −1.25E−03 | 2.51E−03 | −3.87E−03 | 3.59E−03 | −2.16E−03 |
| S9 | Extended aspheric surface | 1.33E+00 | 0.00E+00 | 8.07E−03 | −6.07E−04 | −9.57E−04 | 6.68E−04 | −3.85E−04 | 1.59E−04 |
| S10 | Extended aspheric surface | −8.72E−02 | 0.00E+00 | −5.03E−02 | 2.04E−02 | −6.01E−03 | 1.14E−03 | −1.46E−04 | 1.38E−05 |
| S11 | Extended aspheric surface | −1.00E+00 | 0.00E+00 | −3.50E−02 | 1.02E−02 | −3.90E−03 | 1.11E−03 | −2.36E−04 | 3.66E−05 |
| S12 | surface Extended aspheric | 1.26E−02 | 0.00E+00 | 3.46E−02 | −1.95E−02 | 5.93E−03 | −1.32E−03 | 2.13E−04 | −2.51E−05 |
| S13 | Extended aspheric surface | −1.00E+00 | 0.00E+00 | −5.13E−02 | 5.13E−03 | −3.03E−04 | 5.25E−05 | −9.80E−06 | 1.05E−06 |
| S14 | Extended aspheric surface | −1.00E+00 | 0.00E+00 | −6.22E−02 | 1.16E−02 | −1.85E−03 | 2.37E−04 | −2.27E−05 | 1.59E−06 |

TABLE 9-continued

| | Type | A16 | A18 | A20 | A22 | A24 | A26 | A28 | A30 |
|---|---|---|---|---|---|---|---|---|---|
| S1 | Extended aspheric surface | −1.68E−05 | 2.21E−06 | −1.85E−07 | 9.33E−09 | −2.33E−10 | 0.00E+00 | 0.00E+00 | 0.00E+00 |
| S2 | Extended aspheric surface | 1.63E−05 | −1.75E−06 | 9.79E−08 | −2.07E−09 | 0.00E+00 | 0.00E+00 | 0.00E+00 | 0.00E+00 |
| S3 | Extended aspheric surface | −7.27E−04 | 2.17E−04 | −4.35E−05 | 5.63E−06 | −4.22E−07 | 1.39E−08 | 0.00E+00 | 0.00E+00 |
| S4 | Extended aspheric surface | 1.19E−02 | −5.18E−03 | 1.65E−03 | −3.82E−04 | 6.24E−05 | −6.84E−06 | 4.53E−07 | −1.37E−08 |
| S5 | Extended aspheric surface | −1.20E−02 | 4.61E−03 | −1.28E−03 | 2.52E−04 | −3.39E−05 | 2.92E−06 | −1.39E−07 | 2.57E−09 |
| S6 | Extended aspheric surface | 6.93E−03 | −3.14E−03 | 9.91E−04 | −2.19E−04 | 3.35E−05 | −3.35E−06 | 1.98E−07 | −5.23E−09 |
| S7 | Extended aspheric surface | 1.73E−03 | −6.71E−04 | 1.82E−04 | −3.46E−05 | 4.56E−06 | −3.96E−07 | 2.04E−08 | −4.71E−10 |
| S8 | Extended aspheric surface | 8.99E−04 | −2.65E−04 | 5.60E−05 | −8.41E−06 | 8.76E−07 | −6.02E−08 | 2.46E−09 | −4.51E−11 |
| S9 | Extended aspheric surface | −4.48E−05 | 8.63E−06 | −1.15E−06 | 1.05E−07 | −6.45E−09 | 2.55E−10 | −5.82E−12 | 5.81E−14 |
| S10 | Extended aspheric surface | −1.31E−06 | 1.56E−07 | −1.63E−08 | 1.14E−09 | −4.83E−11 | 1.14E−12 | −1.21E−14 | 1.60E−17 |
| S11 | Extended aspheric surface | −4.05E−06 | 3.20E−07 | −1.80E−08 | 7.21E−10 | −2.00E−11 | 3.66E−13 | −3.98E−15 | 1.95E−17 |
| S12 | Extended aspheric surface | 2.19E−06 | −1.42E−07 | 6.81E−09 | −2.38E−10 | 5.90E−12 | −9.77E−14 | 9.68E−16 | −4.33E−18 |
| S13 | Extended aspheric surface | −7.11E−08 | 3.24E−09 | −1.03E−10 | 2.32E−12 | −3.61E−14 | 3.71E−16 | −2.27E−18 | 6.27E−21 |
| S14 | Extended aspheric surface | −8.09E−08 | 3.02E−09 | −8.23E−11 | 1.62E−12 | −2.24E−14 | 2.06E−16 | −1.14E−18 | 2.85E−21 |

In the 14 aspheric surfaces of the optical lens 410 shown in Table 9, a surface type z of each of the even extended aspheric surfaces may be defined by, including but not limited to, the following aspheric surface formula:

$$z = \frac{cr^2}{1 + \sqrt{1 - (K+1)c^2r^2}} + \sum_i Air^i$$

where z is a vector height of the aspheric surface, r is a radial coordinate of the aspheric surface, c is a spherical curvature of a vertex on the aspheric surface, K is a quadric surface constant, and Ai indicates an $i^{th}$-order aspheric surface coefficient.

Simulation is performed on the optical lens 410 shown in FIG. 11, and a simulation result is described in detail below with reference to the accompanying drawings.

Figure 12:
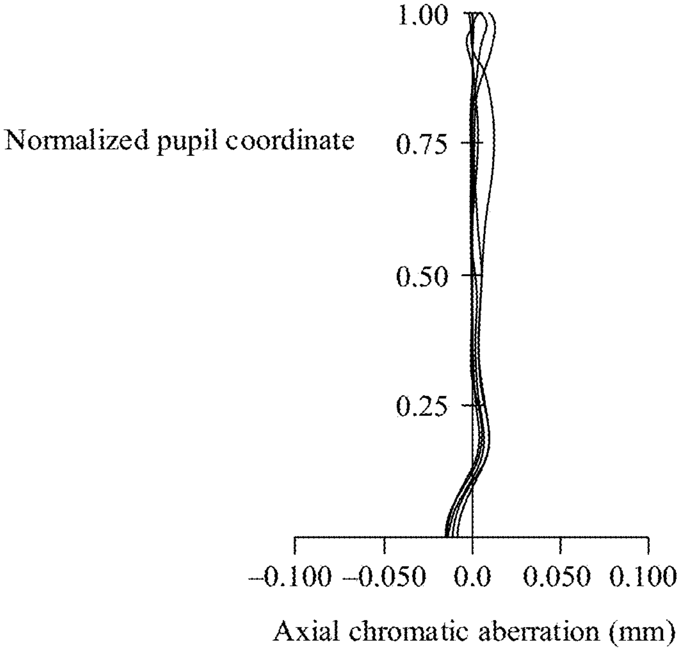
FIG. 12 is a curve diagram of an axial chromatic aberration of a third optical lens according to an embodiment of this application.

FIG. 12 is a curve diagram of an axial chromatic aberration of the third optical lens according to this embodiment of this application. Simulation results of depth of focus locations for color light of wavelengths of 650 nm, 610 nm, 555 nm, 510 nm, and 470 nm are separately shown in the figure. It can be seen that the axial chromatic aberration of the optical lens 410 can be controlled within a very small range.

Figure 13:
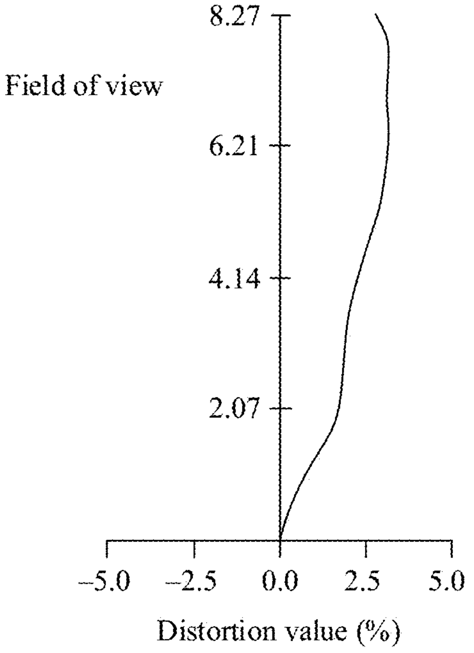
FIG. 13 is a curve diagram of optical distortion of a third optical lens according to an embodiment of this application.

FIG. 13 is a curve diagram of optical distortion of the third optical lens according to this embodiment of this application, and reflects deformation differences between actual imaging shapes and ideal shapes in different fields of view. It can be learned that the optical lens 410 can basically control the optical distortion within 3%.

Figure 14:
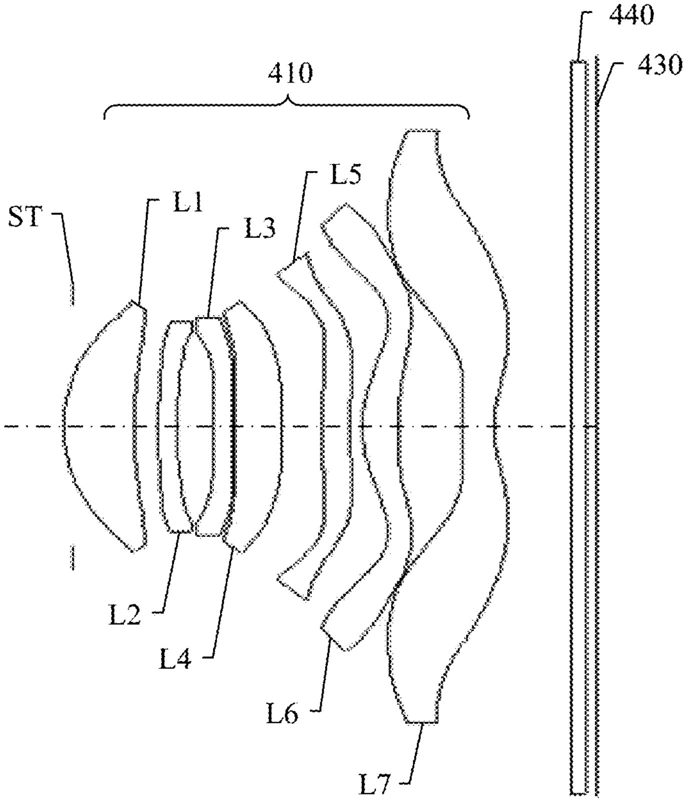
FIG. 14 is a schematic diagram of a structure of a fourth optical lens according to an embodiment of this application.

FIG. 14 is a schematic diagram of a structure of a fourth optical lens according to an embodiment of this application. The optical lens includes a variable aperture ST and seven lenses with a focal power. The seven lenses are respectively a first lens L1, a second lens L2, a third lens L3, a fourth lens L4, a fifth lens L5, a sixth lens L6, and a seventh lens L7. The variable aperture ST is located on an object side of the first lens L1. In addition, a light filter 440 of a camera module is located on an image side of the seventh lens L7, and a photosensitive chip 430 is located on an image side of the light filter 440.

In this embodiment, a distance between a point that is of an object side surface of the first lens L1 and that is farthest away from an imaging surface in projection points of an optical axis and a point that is of an image side surface of the seventh lens L7 and that is closest to the imaging surface in the projection points of the optical axis is TTL1, and TTL1 and an image height IH that can be formed by the optical lens 410 on the imaging surface of the optical lens 410 satisfy: TTL1/IH=0.51.

The first lens L1 has a positive focal power, and a focal length f1 of the first lens L1 and a focal length EFL of the optical lens 410 satisfy: f1/EFL=1.19.

The second lens L2 has a negative focal power, and a focal length f2 of the second lens L2 and the focal length EFL of the optical lens 410 satisfy: f2/EFL=−10.38, and a refractive index n2 of the second lens L2 is 1.677.

An Abbe coefficient vd1 of the first lens L1 and an Abbe coefficient vd2 of the second lens L2 satisfy: vd1−vd2=58.76.

The third lens L3 has a negative focal power.

The fourth lens L4 has a positive focal power.

A focal length f3 of the third lens L3, a focal length f4 of the fourth lens L4, and the focal length EFL of the optical lens 410 satisfy: EFL×(f3+f4)/(f3−f4)=−0.436.

The fifth lens L5 has a negative focal power, and a focal length f5 of the fifth lens L5 and the focal length EFL of the optical lens 410 satisfy: f5/EFL=−1.749.

The sixth lens L6 has a positive focal power, and a focal length f6 of the sixth lens L6 and the focal length EFL of the optical lens 410 satisfy: f6/EFL=0.6535.

The seventh lens L7 has a negative focal power, and a focal length f7 of the seventh lens L7 and the focal length EFL of the optical lens 410 satisfy: f7/EFL=−0.796.

For other design parameters of the optical lens 410, refer to Table 10.

TABLE 10

| | |
|---|---|
| Focal length EFL | 8.287 mm |
| F-number | 1.5 |
| Half-field of view HFOV | 44.88° |
| Image height IH | 16.38 mm |
| Total track length TTL of an optical lens | 10.04 mm |
| Designed wavelength | 650 nm, 610 nm, 555 nm, 510 nm, 470 nm |

In this embodiment of this application, the lenses of the optical lens 410 may all be aspheric lenses, that is, the optical lens 410 includes 14 aspheric surfaces in total. Refer to both Table 11 and Table 12. Table 11 shows curvature radii, thicknesses, refractive indexes, and Abbe coefficients of the lenses in the optical lens 410, and Table 12 shows aspheric coefficients of the lenses.

TABLE 11

| | Description | Curvature radius | Thickness/Distance | | Refractive index | | Abbe coefficient | |
|---|---|---|---|---|---|---|---|---|
| ST | Variable aperture | — | T01 | −0.15045 | | — | | — |
| S1 | First lens | 3.444923 | CT1 | 1.318993 | n1 | 1.506 | vd1 | 78 |
| S2 | | 9.654495 | T12 | 0.457363 | | | | |
| S3 | Second lens | 10.77919 | CT2 | 0.349229 | n2 | 1.677569 | vd2 | 19.24591 |
| S4 | | 8.976906 | T23 | 0.692285 | | | | |
| S5 | Third lens | −80.1643 | CT3 | 0.342708 | n3 | 1.677569 | vd3 | 19.24591 |
| S6 | | 16.45316 | T34 | 0.060037 | | | | |
| S7 | Fourth lens | 15.98772 | CT4 | 0.887485 | n4 | 1.545869 | vd4 | 56.1354 |
| S8 | | −54.121 | T45 | 0.738722 | | | | |
| S9 | Fifth lens | 7.068175 | CT5 | 0.518706 | n5 | 1.570378 | vd5 | 37.31465 |
| S10 | | 3.707378 | T56 | 0.256354 | | | | |
| S11 | Sixth lens | 2.838301 | CT6 | 0.685176 | n6 | 1.545869 | vd6 | 56.1354 |
| S12 | | 65.47872 | T67 | 1.194498 | | | | |
| S13 | Seventh lens | 10.5044 | CT7 | 0.594528 | n7 | 1.545869 | vd7 | 56.1354 |
| S14 | | 2.627102 | T78 | 1.457547 | | | | |
| S15 | Light filter | — | CT8 | 0.3009 | n8 | 1.518274 | vd8 | 64.16641 |
| S16 | | — | T89 | 0.188626 | | | | |
| | Imaging surface | — | — | 0 | — | — | — | — |

TABLE 12

| | Type | K | A2 | A4 | A6 | A8 | A10 | A12 | A14 |
|---|---|---|---|---|---|---|---|---|---|
| S1 | Extended aspheric surface | 5.29E−02 | 0.00E+00 | −7.90E−04 | 1.10E−03 | −9.80E−04 | 5.36E−04 | −1.87E−04 | 4.17E−05 |
| S2 | Extended aspheric surface | −2.45E+00 | 0.00E+00 | −1.82E−03 | −1.26E−03 | 1.46E−03 | −9.84E−04 | 4.01E−04 | −9.99E−05 |
| S3 | Extended aspheric surface | −1.02E+00 | 0.00E+00 | −6.76E−03 | −8.22E−03 | 2.22E−02 | −3.48E−02 | 3.70E−02 | −2.77E−02 |
| S4 | Extended aspheric surface | −4.00E−02 | 0.00E+00 | −5.20E−03 | −9.99E−04 | −2.77E−03 | 1.46E−02 | −2.58E−02 | 2.68E−02 |
| S5 | Extended aspheric surface | 4.86E+01 | 0.00E+00 | −8.56E−03 | 9.86E−03 | −1.63E−02 | 7.96E−03 | 7.93E−03 | −1.76E−02 |
| S6 | Extended aspheric surface | 3.54E−01 | 0.00E+00 | −3.70E−02 | 5.84E−02 | −7.15E−02 | 5.71E−02 | −3.15E−02 | 1.19E−02 |
| S7 | Extended aspheric surface | 2.54E+00 | 0.00E+00 | −4.98E−02 | 6.71E−02 | −7.77E−02 | 6.26E−02 | −3.62E−02 | 1.51E−02 |
| S8 | Extended aspheric surface | −4.66E+01 | 0.00E+00 | −2.11E−02 | 9.90E−03 | −5.82E−03 | 1.03E−03 | 1.15E−03 | −1.16E−03 |
| S9 | Extended aspheric surface | −4.65E−02 | 0.00E+00 | −5.48E−02 | 3.88E−02 | −2.25E−02 | 1.08E−02 | −4.25E−03 | 1.31E−03 |
| S10 | Extended aspheric surface | −1.01E+00 | 0.00E+00 | −1.02E−01 | 4.91E−02 | −2.12E−02 | 8.21E−03 | −2.67E−03 | 6.68E−04 |
| S11 | Extended aspheric surface | −1.00E+00 | 0.00E+00 | −2.22E−02 | 2.48E−03 | 6.41E−04 | −7.47E−04 | 2.67E−04 | −5.45E−05 |
| S12 | surface Extended aspheric | 2.89E+01 | 0.00E+00 | 3.87E−02 | −1.09E−02 | 1.26E−03 | −5.81E−05 | 2.74E−06 | −1.92E−06 |
| S13 | Extended aspheric surface | 3.37E−02 | 0.00E+00 | −5.20E−02 | 1.09E−02 | −2.19E−03 | 3.48E−04 | −3.73E−05 | 2.72E−06 |
| S14 | Extended aspheric surface | −9.99E−01 | 0.00E+00 | −6.11E−02 | 1.47E−02 | −3.05E−03 | 4.78E−04 | −5.46E−05 | 4.52E−06 |

TABLE 12-continued

| | Type | A16 | A18 | A20 | A22 | A24 | A26 | A28 | A30 |
|---|---|---|---|---|---|---|---|---|---|
| S1 | Extended aspheric surface | −5.82E−06 | 4.62E−07 | −1.59E−08 | 0.00E+00 | 0.00E+00 | 0.00E+00 | 0.00E+00 | 0.00E+00 |
| S2 | Extended aspheric surface | 1.49E−05 | −1.21E−06 | 4.08E−08 | 0.00E+00 | 0.00E+00 | 0.00E+00 | 0.00E+00 | 0.00E+00 |
| S3 | Extended aspheric surface | 1.50E−02 | −5.91E−03 | 1.70E−03 | −3.51E−04 | 5.07E−05 | −4.85E−06 | 2.76E−07 | −7.06E−09 |
| S4 | Extended aspheric surface | −1.85E−02 | 8.89E−03 | −3.03E−03 | 7.29E−04 | −1.21E−04 | 1.33E−05 | −8.62E−07 | 2.50E−08 |
| S5 | Extended aspheric surface | 1.58E−02 | −8.74E−03 | 3.27E−03 | −8.46E−04 | 1.49E−04 | −1.71E−05 | 1.16E−06 | −3.51E−08 |
| S6 | Extended aspheric surface | −2.99E−03 | 4.13E−04 | 1.19E−06 | −1.28E−05 | 2.60E−06 | −2.61E−07 | 1.35E−08 | −2.80E−10 |
| S7 | Extended aspheric surface | −4.54E−03 | 9.43E−04 | −1.27E−04 | 8.75E−06 | 1.70E−07 | −8.97E−08 | 7.08E−09 | −1.98E−10 |
| S8 | Extended aspheric surface | 5.76E−04 | −1.86E−04 | 4.20E−05 | −6.65E−06 | 7.29E−07 | −5.26E−08 | 2.26E−09 | −4.36E−11 |
| S9 | Extended aspheric surface | −3.06E−04 | 5.35E−05 | −6.90E−06 | 6.46E−07 | −4.26E−08 | 1.88E−09 | −4.97E−11 | 5.96E−13 |
| S10 | Extended aspheric surface | −1.24E−04 | 1.70E−05 | −1.67E−06 | 1.17E−07 | −5.70E−09 | 1.82E−10 | −3.43E−12 | 2.90E−14 |
| S11 | Extended aspheric surface | 7.14E−06 | −6.25E−07 | 3.69E−08 | −1.45E−09 | 3.65E−11 | −5.31E−13 | 3.38E−15 | 5.29E−19 |
| S12 | Extended aspheric surface | 4.39E−07 | −4.99E−08 | 3.40E−09 | −1.48E−10 | 4.09E−12 | −6.89E−14 | 6.25E−16 | −2.17E−18 |
| S13 | Extended aspheric surface | −1.38E−07 | 5.01E−09 | −1.30E−10 | 2.37E−12 | −2.98E−14 | 2.41E−16 | −1.10E−18 | 2.08E−21 |
| S14 | Extended aspheric surface | −2.72E−07 | 1.20E−08 | −3.82E−10 | 8.75E−12 | −1.40E−13 | 1.48E−15 | −9.33E−18 | 2.64E−20 |

In the 14 aspheric surfaces of the optical lens 410 shown in Table 12, a surface type z of each of the even extended aspheric surfaces may be defined by, including but not limited to, the following aspheric surface formula:

$$z = \frac{cr^2}{1 + \sqrt{1 - (K + 1)c^2r^2}} + \sum_i Air^i$$

where z is a vector height of the aspheric surface, r is a radial coordinate of the aspheric surface, c is a spherical curvature of a vertex on the aspheric surface, K is a quadric surface constant, and Ai indicates an $i^{th}$-order aspheric surface coefficient.

Simulation is performed on the optical lens 410 shown in FIG. 14, and a simulation result is described in detail below with reference to the accompanying drawings.

Figure 15:
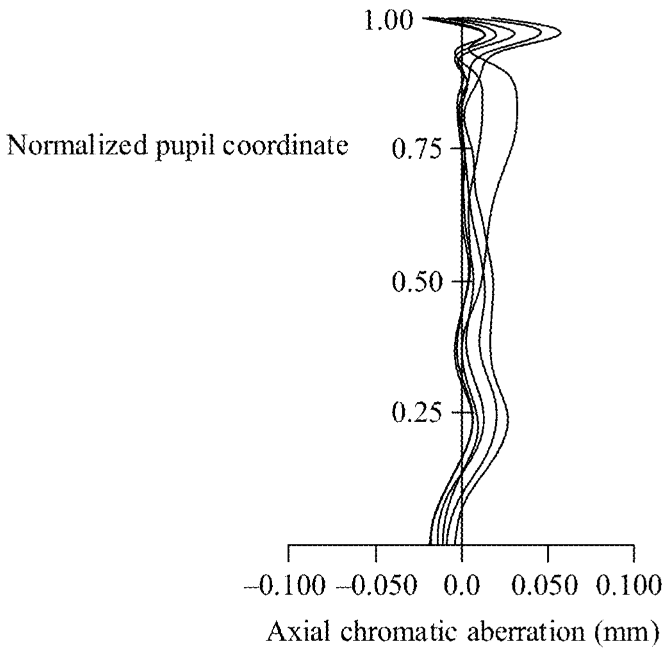
FIG. 15 is a curve diagram of an axial chromatic aberration of a fourth optical lens according to an embodiment of this application.

FIG. 15 is a curve diagram of an axial chromatic aberration of the fourth optical lens according to this embodiment of this application. Simulation results of depth of focus locations for color light of wavelengths of 650 nm, 610 nm, 555 nm, 510 nm, and 470 nm are separately shown in the figure. It can be seen that the axial chromatic aberration of the optical lens 410 can be controlled within a very small range.

Figure 16:
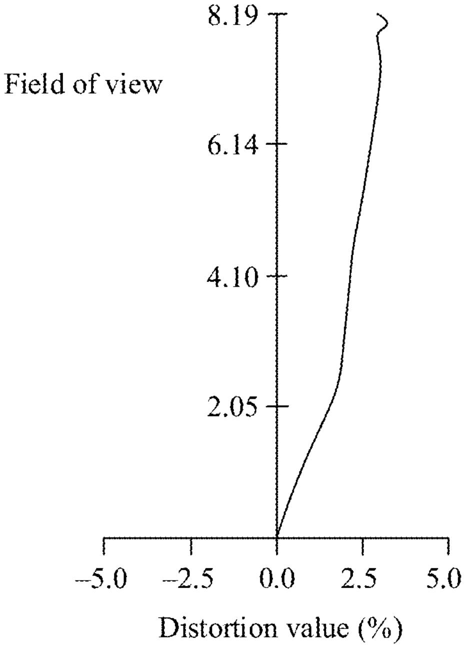
FIG. 16 is a curve diagram of optical distortion of a fourth optical lens according to an embodiment of this application.

FIG. 16 is a curve diagram of optical distortion of the fourth optical lens according to this embodiment of this application, and reflects deformation differences between actual imaging shapes and ideal shapes in different fields of view. It can be learned that the optical lens 410 can basically control the optical distortion within 3%.

Figure 17:
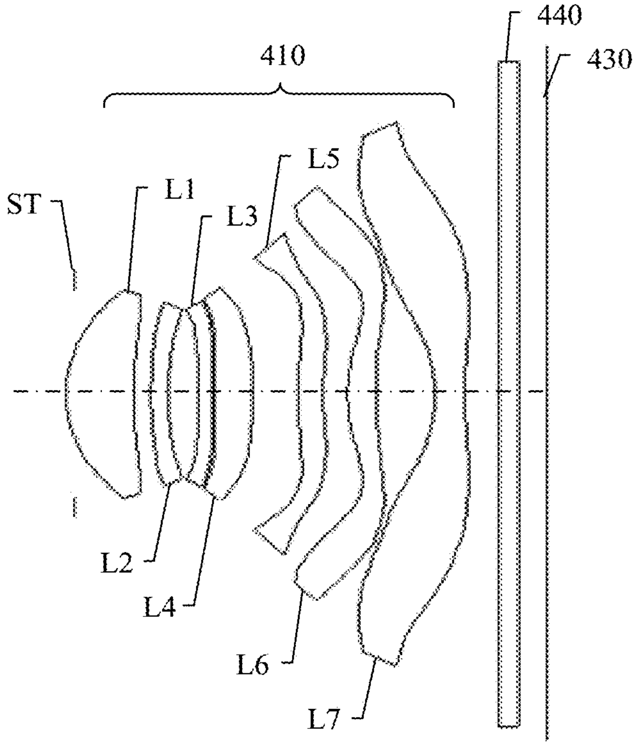
FIG. 17 is a schematic diagram of a structure of a fifth optical lens according to an embodiment of this application.

FIG. 17 is a schematic diagram of a structure of a fifth optical lens according to an embodiment of this application. The optical lens 410 includes a variable aperture ST and seven lenses with a focal power. The seven lenses are respectively a first lens L1, a second lens L2, a third lens L3, a fourth lens L4, a fifth lens L5, a sixth lens L6, and a seventh lens L7. The variable aperture ST is located on an object side of the first lens L1. In addition, a light filter 440 of a camera module is located on an image side of the seventh lens L7, and a photosensitive chip 430 is located on an image side of the light filter 440.

In this embodiment, a distance between a point that is of an object side surface of the first lens L1 and that is farthest away from an imaging surface in projection points of an optical axis and a point that is of an image side surface of the seventh lens L7 and that is closest to the imaging surface in the projection points of the optical axis is TTL1, and TTL1 and an image height IH that can be formed by the optical lens 410 on the imaging surface of the optical lens 410 satisfy: TTL1/IH=0.49.

The first lens L1 has a positive focal power, and a focal length f1 of the first lens L1 and a focal length EFL of the optical lens 410 satisfy: f1/EFL=1.138.

The second lens L2 has a negative focal power, and a focal length f2 of the second lens L2 and the focal length EFL of the optical lens 410 satisfy: f2/EFL=−9.22, and a refractive index n2 of the second lens L2 is 1.677.

An Abbe coefficient vd1 of the first lens L1 and an Abbe coefficient vd2 of the second lens L2 satisfy: vd1−vd2=75.85.

The third lens L3 has a negative focal power.

The fourth lens L4 has a positive focal power.

A focal length f3 of the third lens L3, a focal length f4 of the fourth lens L4, and the focal length EFL of the optical lens 410 satisfy: EFL×(f3+f4)/(f3−f4)=1.006.

The fifth lens L5 has a positive focal power, and a focal length f5 of the fifth lens L5 and the focal length EFL of the optical lens 410 satisfy: f5/EFL=23.05.

The sixth lens L6 has a positive focal power, and a focal length f6 of the sixth lens L6 and the focal length EFL of the optical lens 410 satisfy: f6/EFL=1.077.

The seventh lens L7 has a negative focal power, and a focal length f7 of the seventh lens L7 and the focal length EFL of the optical lens 410 satisfy: f7/EFL=−0.602.

For other design parameters of the optical lens 410, refer to Table 13.

TABLE 13

| | |
|---|---|
| Focal length EFL | 8.503 mm |
| F-number | 1.6 |
| Half-field of view HFOV | 44.24° |
| Image height IH | 16.834 mm |
| Total track length TTL of an optical lens | 9.855 mm |
| Designed wavelength | 650 nm, 610 nm, 555 nm, 510 nm, 470 nm |

In this embodiment of this application, the lenses of the optical lens 410 may all be aspheric lenses, that is, the optical lens 410 includes 14 aspheric surfaces in total. Refer to both Table 14 and Table 15. Table 14 shows curvature radii, thicknesses, refractive indexes, and Abbe coefficients of the lenses in the optical lens 410, and Table 15 shows aspheric coefficients of the lenses.

TABLE 14

| | Description | Curvature radius | Thickness/Distance | | Refractive index | | Abbe coefficient | |
|---|---|---|---|---|---|---|---|---|
| ST | Variable aperture | — | T01 | −0.17439 | | — | | — |
| S1 | First lens | 3.174602 | CT1 | 1.388264 | n1 | 1.437842 | vd1 | 95.09901 |
| S2 | | 10.97971 | T12 | 0.353326 | | | | |
| S3 | Second lens | 8.688699 | CT2 | 0.349029 | n2 | 1.677569 | vd2 | 19.24591 |
| S4 | | 7.346069 | T23 | 0.627248 | | | | |
| S5 | Third lens | −19.751 | CT3 | 0.28931 | n3 | 1.677569 | vd3 | 19.24591 |
| S6 | | −2004.01 | T34 | 0.038976 | | | | |
| S7 | Fourth lens | 17.01007 | CT4 | 0.770712 | n4 | 1.545869 | vd4 | 56.1354 |
| S8 | | −48.9301 | T45 | 0.929947 | | | | |
| S9 | Fifth lens | 8.952514 | CT5 | 0.524316 | n5 | 1.570378 | vd5 | 37.31465 |
| S10 | | 9.524964 | T56 | 0.495075 | | | | |
| S11 | Sixth lens | 4.746795 | CT6 | 0.592748 | n6 | 1.545869 | vd6 | 56.1354 |
| S12 | | 90.41368 | T67 | 1.194184 | | | | |
| S13 | Seventh lens | −4.58835 | CT7 | 0.613291 | n7 | 1.545869 | vd7 | 56.1354 |
| S14 | | 7.479962 | T78 | 0.67985 | | | | |
| S15 | Light filter | — | CT8 | 0.41 | n8 | 1.518274 | vd8 | 64.16641 |
| S16 | | — | T89 | 0.599 | | | | |
| | Imaging surface | — | — | 0 | — | — | — | — |

TABLE 15

| | Type | K | A2 | A4 | A6 | A8 | A10 | A12 | A14 |
|---|---|---|---|---|---|---|---|---|---|
| S1 | Extended aspheric surface | 0.00E+00 | 0.00E+00 | −3.40E−04 | 1.51E−04 | −2.28E−04 | 1.82E−04 | −8.76E−05 | 2.49E−05 |
| S2 | Extended aspheric surface | 0.00E+00 | 0.00E+00 | −4.06E−03 | 1.14E−04 | 9.44E−06 | −1.49E−05 | 1.46E−05 | −6.23E−06 |
| S3 | Extended aspheric surface | 0.00E+00 | 0.00E+00 | −7.61E−03 | −3.84E−03 | 7.72E−03 | −8.46E−03 | 6.56E−03 | −3.54E−03 |
| S4 | Extended aspheric surface | 0.00E+00 | 0.00E+00 | −5.08E−03 | −8.22E−04 | 3.27E−03 | −5.61E−03 | 6.80E−03 | −5.39E−03 |
| S5 | Extended aspheric surface | 0.00E+00 | 0.00E+00 | 1.64E−02 | −5.30E−02 | 1.22E−01 | −1.98E−01 | 2.17E−01 | −1.66E−01 |
| S6 | Extended aspheric surface | −9.80E+01 | 0.00E+00 | 2.65E−02 | −1.08E−01 | 2.09E−01 | −2.63E−01 | 2.23E−01 | −1.32E−01 |
| S7 | Extended aspheric surface | −9.28E+01 | 0.00E+00 | 9.63E−04 | −6.23E−02 | 1.02E−01 | −9.03E−02 | 3.96E−02 | 2.35E−03 |
| S8 | Extended aspheric surface | 4.46E−01 | 0.00E+00 | −1.03E−02 | −1.35E−02 | 2.80E−02 | −3.73E−02 | 3.39E−02 | −2.16E−02 |
| S9 | Extended aspheric surface | −9.71E+00 | 0.00E+00 | 1.04E−04 | −9.60E−03 | 1.79E−03 | 4.50E−03 | −4.60E−03 | 2.29E−03 |
| S10 | Extended aspheric surface | −6.80E+00 | 0.00E+00 | 6.78E−03 | −3.54E−02 | 2.68E−02 | −1.21E−02 | 3.71E−03 | −7.98E−04 |
| S11 | surface Extended aspheric | 4.16E−04 | 0.00E+00 | 2.36E−02 | −3.00E−02 | 1.49E−02 | −5.11E−03 | 1.25E−03 | −2.26E−04 |
| S12 | surface Extended aspheric | 9.79E+01 | 0.00E+00 | 3.20E−02 | −1.63E−02 | 5.07E−03 | −1.02E−03 | 1.25E−04 | −7.56E−06 |
| S13 | Extended aspheric surface | −1.03E+00 | 0.00E+00 | −1.77E−02 | 5.43E−03 | −1.21E−03 | 2.61E−04 | −3.95E−05 | 3.94E−06 |
| S14 | Extended aspheric surface | −7.03E−03 | 0.00E+00 | −2.64E−02 | 7.26E−03 | −1.58E−03 | 2.53E−04 | −2.91E−05 | 2.41E−06 |

TABLE 15-continued

| | Type | A16 | A18 | A20 | A22 | A24 | A26 | A28 | A30 |
|---|---|---|---|---|---|---|---|---|---|
| S1 | Extended aspheric surface | −4.18E−06 | 3.79E−07 | −1.46E−08 | 0.00E+00 | 0.00E+00 | 0.00E+00 | 0.00E+00 | 0.00E+00 |
| S2 | Extended aspheric surface | 1.30E−06 | −1.32E−07 | 5.07E−09 | 0.00E+00 | 0.00E+00 | 0.00E+00 | 0.00E+00 | 0.00E+00 |
| S3 | Extended aspheric surface | 1.33E−03 | −3.52E−04 | 6.37E−05 | −7.55E−06 | 5.29E−07 | −1.66E−08 | 0.00E+00 | 0.00E+00 |
| S4 | Extended aspheric surface | 2.86E−03 | −1.03E−03 | 2.48E−04 | −3.83E−05 | 3.42E−06 | −1.34E−07 | 0.00E+00 | 0.00E+00 |
| S5 | Extended aspheric surface | 8.96E−02 | −3.45E−02 | 9.40E−03 | −1.77E−03 | 2.19E−04 | −1.60E−05 | 5.24E−07 | 0.00E+00 |
| S6 | Extended aspheric surface | 5.58E−02 | −1.68E−02 | 3.58E−03 | −5.26E−04 | 5.08E−05 | −2.89E−06 | 7.35E−08 | 0.00E+00 |
| S7 | Extended aspheric surface | −1.44E−02 | 9.51E−03 | −3.54E−03 | 8.52E−04 | −1.35E−04 | 1.37E−05 | −8.07E−07 | 2.10E−08 |
| S8 | Extended aspheric surface | 9.82E−03 | −3.22E−03 | 7.65E−04 | −1.30E−04 | 1.54E−05 | −1.20E−06 | 5.61E−08 | −1.18E−09 |
| S9 | Extended aspheric surface | −7.26E−04 | 1.57E−04 | −2.40E−05 | 2.58E−06 | −1.92E−07 | 9.41E−09 | −2.73E−10 | 3.56E−12 |
| S10 | Extended aspheric surface | 1.23E−04 | −1.37E−05 | 1.11E−06 | −6.35E−08 | 2.52E−09 | −6.59E−11 | 1.01E−12 | −6.90E−15 |
| S11 | Extended aspheric surface | 3.01E−05 | −2.93E−06 | 2.06E−07 | −1.03E−08 | 3.61E−10 | −8.28E−12 | 1.13E−13 | −6.88E−16 |
| S12 | Extended aspheric surface | −1.22E−07 | 6.53E−08 | −6.06E−09 | 3.17E−10 | −1.05E−11 | 2.17E−13 | −2.59E−15 | 1.37E−17 |
| S13 | Extended aspheric surface | −2.68E−07 | 1.27E−08 | −4.31E−10 | 1.04E−11 | −1.74E−13 | 1.95E−15 | −1.30E−17 | 3.92E−20 |
| S14 | Extended aspheric surface | −1.44E−07 | 6.24E−09 | −1.96E−10 | 4.43E−12 | −7.04E−14 | 7.45E−16 | −4.72E−18 | 1.36E−20 |

In the 14 aspheric surfaces of the optical lens 410 shown in Table 15, a surface type z of each of the even extended aspheric surfaces may be defined by, including but not limited to, the following aspheric surface formula:

$$z = \frac{cr^2}{1 + \sqrt{1 - (K+1)c^2r^2}} + \sum_i Air^i$$

where z is a vector height of the aspheric surface, r is a radial coordinate of the aspheric surface, c is a spherical curvature of a vertex on the aspheric surface, K is a quadric surface constant, and Ai indicates an $i^{th}$-order aspheric surface coefficient.

Simulation is performed on the optical lens 410 shown in FIG. 17, and a simulation result is described in detail below with reference to the accompanying drawings.

Figure 18:
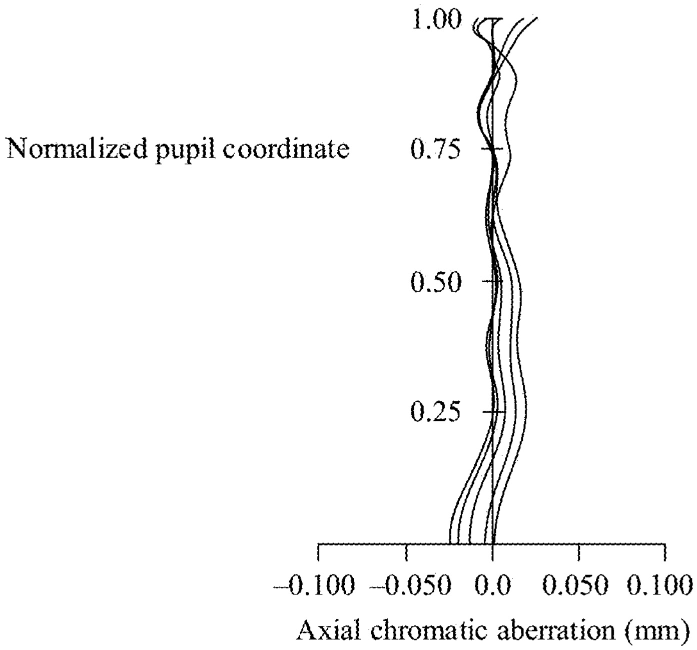
FIG. 18 is a curve diagram of an axial chromatic aberration of a fifth optical lens according to an embodiment of this application.

FIG. 18 is a curve diagram of an axial chromatic aberration of the fifth optical lens according to this embodiment of this application. Simulation results of depth of focus locations for color light of wavelengths of 650 nm, 610 nm, 555 nm, 510 nm, and 470 nm are separately shown in the figure. It can be seen that the axial chromatic aberration of the optical lens 410 can be controlled within a very small range.

Figure 19:
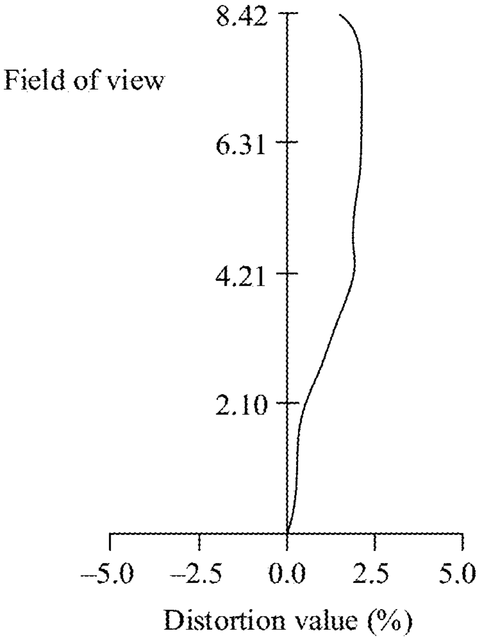
FIG. 19 is a curve diagram of optical distortion of a fifth optical lens according to an embodiment of this application.

FIG. 19 is a curve diagram of optical distortion of the fifth optical lens according to this embodiment of this application, and reflects deformation differences between actual imaging shapes and ideal shapes in different fields of view. It can be learned that the optical lens 410 can basically control the optical distortion within 3%.

Figure 20:
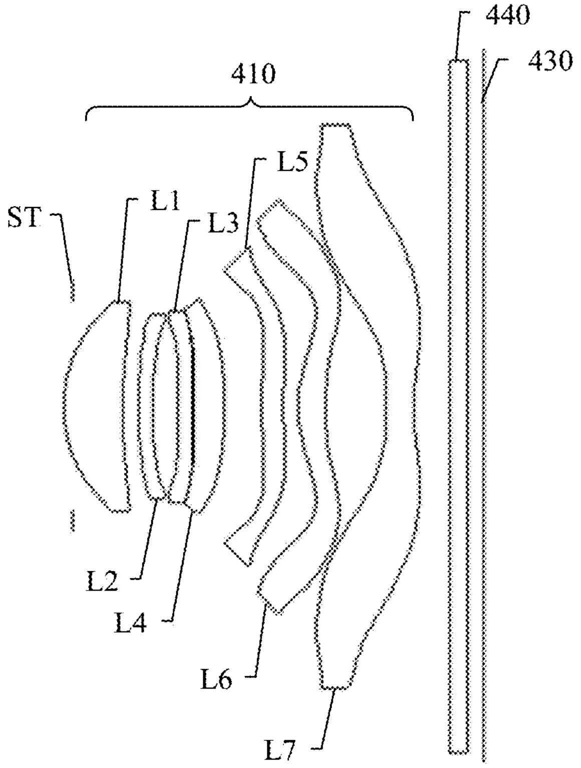
FIG. 20 is a schematic diagram of a structure of a fourth optical lens according to an embodiment of this application.

FIG. 20 is a schematic diagram of a structure of a fourth optical lens according to an embodiment of this application. The optical lens 410 includes a variable aperture ST and seven lenses with a focal power. The seven lenses are respectively a first lens L1, a second lens L2, a third lens L3, a fourth lens L4, a fifth lens L5, a sixth lens L6, and a seventh lens L7. The variable aperture ST is located on an object side of the first lens L1. In addition, a light filter 440 of a camera module is located on an image side of the seventh lens L7, and a photosensitive chip 430 is located on an image side of the light filter 440.

In this embodiment, a distance between a point that is of an object side surface of the first lens L1 and that is farthest away from an imaging surface in projection points of an optical axis and a point that is of an image side surface of the seventh lens L7 and that is closest to the imaging surface in the projection points of the optical axis is TTL1, and TTL1 and an image height IH that can be formed by the optical lens 410 on the imaging surface of the optical lens 410 satisfy: TTL1/IH=0.49.

The first lens L1 has a positive focal power, and a focal length f1 of the first lens L1 and a focal length EFL of the optical lens 410 satisfy: f1/EFL=1.14.

The second lens L2 has a negative focal power, and a focal length f2 of the second lens L2 and the focal length EFL of the optical lens 410 satisfy: f2/EFL=−10.1, and a refractive index n2 of the second lens L2 is 1.677.

An Abbe coefficient vd1 of the first lens L1 and an Abbe coefficient vd2 of the second lens L2 satisfy: vd1−vd2=75.85.

The third lens L3 has a negative focal power.

The fourth lens L4 has a positive focal power.

A focal length f3 of the third lens L3, a focal length f4 of the fourth lens L4, and the focal length EFL of the optical lens 410 satisfy: EFL×(f3+f4)/(f3−f4)=1.22.

The fifth lens L5 has a negative focal power, and a focal length f5 of the fifth lens L5 and the focal length EFL of the optical lens 410 satisfy: f5/EFL=−2.46.

The sixth lens L6 has a positive focal power, and a focal length f6 of the sixth lens L6 and the focal length EFL of the optical lens 410 satisfy: f6/EFL=0.845.

The seventh lens L7 has a negative focal power, and a focal length f7 of the seventh lens L7 and the focal length EFL of the optical lens 410 satisfy: f7/EFL=−0.694.

For other design parameters of the optical lens 410, refer to Table 16.

TABLE 16

| | |
|---|---|
| Focal length EFL | 8.355 mm |
| F-number | 1.6 |
| Half-field of view HFOV | 44.5° |
| Image height IH | 16.8 mm |
| Total track length TTL of an optical lens | 9.7 mm |
| Designed wavelength | 650 nm, 610 nm, 555 nm, 510 nm, 470 nm |

In this embodiment of this application, the lenses of the optical lens 410 may all be aspheric lenses, that is, the optical lens 410 includes 14 aspheric surfaces in total. Refer to both Table 17 and Table 18. Table 17 shows curvature radii, thicknesses, refractive indexes, and Abbe coefficients of the lenses in the optical lens 410, and Table 18 shows aspheric coefficients of the lenses.

TABLE 17

| | Description | Curvature radius | Thickness/Distance | | | Refractive index | | Abbe coefficient |
|---|---|---|---|---|---|---|---|---|
| ST | Variable aperture | — | T01 | −0.2 | | — | | — |
| S1 | First lens | 3.141688 | CT1 | 1.362713 | n1 | 1.437842 | vd1 | 95.09901 |
| S2 | | 10.9552 | T12 | 0.361955 | | | | |
| S3 | Second lens | 8.61365 | CT2 | 0.316912 | n2 | 1.677569 | vd2 | 19.24591 |
| S4 | | 7.373807 | T23 | 0.600893 | | | | |
| S5 | Third lens | −198.195 | CT3 | 0.31 | n3 | 1.677569 | vd3 | 19.24591 |
| S6 | | 32.72777 | T34 | 0.06252 | | | | |
| S7 | Fourth lens | 37.40211 | CT4 | 0.677856 | n4 | 1.545869 | vd4 | 56.1354 |
| S8 | | −30.5002 | T45 | 0.873835 | | | | |
| S9 | Fifth lens | 8.593156 | CT5 | 0.493551 | n5 | 1.570378 | vd5 | 37.31465 |
| S10 | | 4.853536 | T56 | 0.34742 | | | | |
| S11 | Sixth lens | 2.902898 | CT6 | 0.644322 | n6 | 1.545869 | vd6 | 56.1354 |
| S12 | | 10.8304 | T67 | 1.398494 | | | | |
| S13 | Seventh lens | −13.9348 | CT7 | 0.621891 | n7 | 1.545869 | vd7 | 56.1354 |
| S14 | | 4.167846 | T78 | 0.829578 | | | | |
| S15 | Light filter | — | CT8 | 0.41 | n8 | 1.518274 | vd8 | 64.16641 |
| S16 | | — | T89 | 0.388062 | | | | |
| | Imaging surface | — | — | 0 | — | — | — | — |

TABLE 18

| | Type | K | A2 | A4 | A6 | A8 | A10 | A12 | A14 |
|---|---|---|---|---|---|---|---|---|---|
| S1 | Extended aspheric surface | 4.42E−01 | 0.00E+00 | −2.89E−03 | 1.42E−03 | −1.99E−03 | 1.36E−03 | −5.90E−04 | 1.59E−04 |
| S2 | Extended aspheric surface | −1.23E+01 | 0.00E+00 | −2.32E−03 | −1.26E−03 | 2.04E−03 | −1.72E−03 | 8.50E−04 | −2.54E−04 |
| S3 | Extended aspheric surface | 0.00E+00 | 0.00E+00 | −1.01E−02 | 4.75E−03 | −1.22E−02 | 2.33E−02 | −2.90E−02 | 2.51E−02 |
| S4 | Extended aspheric surface | 0.00E+00 | 0.00E+00 | −4.40E−03 | −1.14E−02 | 4.27E−02 | −9.24E−02 | 1.33E−01 | −1.31E−01 |
| S5 | Extended aspheric surface | 0.00E+00 | 0.00E+00 | −3.94E−03 | 7.92E−03 | −2.85E−02 | 4.49E−02 | −4.57E−02 | 3.17E−02 |
| S6 | Extended aspheric surface | 0.00E+00 | 0.00E+00 | −6.38E−03 | 1.28E−02 | −3.14E−02 | 3.70E−02 | −2.73E−02 | 1.30E−02 |
| S7 | Extended aspheric surface | 0.00E+00 | 0.00E+00 | −1.63E−02 | 1.56E−02 | −3.06E−02 | 3.37E−02 | −2.37E−02 | 1.09E−02 |
| S8 | Extended aspheric surface | 0.00E+00 | 0.00E+00 | −1.53E−02 | 8.34E−03 | −1.66E−02 | 2.26E−02 | −2.14E−02 | 1.43E−02 |
| S9 | Extended aspheric surface | 0.00E+00 | 0.00E+00 | −3.53E−02 | 2.05E−02 | −1.20E−02 | 6.56E−03 | −3.22E−03 | 1.27E−03 |
| S10 | Extended aspheric surface | 0.00E+00 | 0.00E+00 | −7.33E−02 | 2.82E−02 | −1.00E−02 | 3.51E−03 | −1.17E−03 | 3.21E−04 |
| S11 | Extended aspheric surface | −1.00E+00 | 0.00E+00 | −1.99E−02 | −1.09E−03 | 1.74E−03 | −7.89E−04 | 2.04E−04 | −3.49E−05 |
| S12 | Extended aspheric surface | 0.00E+00 | 0.00E+00 | 2.66E−02 | −1.16E−02 | 2.99E−03 | −6.21E−−04 | 9.76E−05 | −1.12E−05 |
| S13 | Extended aspheric surface | 0.00E+00 | 0.00E+00 | −3.58E−02 | 7.98E−03 | −1.31E−03 | 1.71E−04 | −1.64E−05 | 1.12E−06 |
| S14 | Extended aspheric surface | −1.00E+00 | 0.00E+00 | −4.15E−02 | 9.73E−03 | 1.91E−03 | 2.87E−04 | −3.20E−05 | 2.63E−06 |

TABLE 18-continued

| | Type | A16 | A18 | A20 | A22 | A24 | A26 | A28 | A30 |
|---|---|---|---|---|---|---|---|---|---|
| S1 | Extended aspheric surface | −2.61E−05 | 2.39E−06 | −9.46E−08 | 0.00E+00 | 0.00E+00 | 0.00E+00 | 0.00E+00 | 0.00E+00 |
| S2 | Extended aspheric surface | 4.48E−05 | −4.31E−06 | 1.73E−07 | 0.00E+00 | 0.00E+00 | 0.00E+00 | 0.00E+00 | 0.00E+00 |
| S3 | Extended aspheric surface | −1.54E−02 | 6.76E−03 | −2.14E−03 | 4.85E−04 | −7.62E−05 | 7.90E−06 | −4.87E−07 | 1.35E−08 |
| S4 | Extended aspheric surface | 9.20E−02 | −4.65E−02 | 1.69E−02 | −4.40E−03 | 7.97E−04 | −9.56E−05 | 6.81E−06 | −2.18E−07 |
| S5 | Extended aspheric surface | −1.54E−02 | 5.25E−03 | −1.22E−03 | 1.81E−04 | −1.39E−05 | −7.33E−08 | 1.00E−07 | −5.54E−09 |
| S6 | Extended aspheric surface | −3.62E−03 | 2.66E−04 | 2.27E−04 | −1.06E−04 | 2.32E−05 | −2.92E−06 | 2.01E−07 | −5.89E−09 |
| S7 | Extended aspheric surface | −3.00E−03 | 1.86E−04 | 2.15E−04 | −9.95E−05 | 2.24E−05 | −2.91E−06 | 2.08E−07 | −6.32E−09 |
| S8 | Extended aspheric surface | −6.73E−03 | 2.28E−03 | −5.52E−04 | 9.52E−05 | −1.14E−05 | 8.94E−07 | −4.16E−08 | 8.66E−10 |
| S9 | Extended aspheric surface | −3.80E−04 | 8.56E−05 | −1.42E−05 | 1.72E−06 | −1.46E−07 | 8.18E−09 | −2.73E−10 | 4.09E−12 |
| S10 | Extended aspheric surface | −6.60E−05 | 9.93E−06 | −1.07E−06 | 8.23E−08 | −4.35E−09 | 1.50E−10 | −3.07E−12 | 2.81E−14 |
| S11 | Extended aspheric surface | 4.17E−06 | −3.48E−07 | 2.04E−08 | −8.34E−10 | 2.32E−11 | −4.18E−13 | 4.42E−15 | −2.07E−17 |
| S12 | Extended aspheric surface | 9.11E−07 | −5.19E−08 | 1.96E−09 | −4.25E−11 | 1.90E−13 | 1.52E−14 | −3.81E−16 | 3.00E−18 |
| S13 | Extended aspheric surface | −5.57E−08 | 2.01E−09 | −5.30E−11 | 1.01E−12 | −1.36E−14 | 1.23E−16 | −6.68E−19 | 1.66E−21 |
| S14 | Extended aspheric surface | −1.58E−07 | 6.94E−09 | −2.21E−10 | 5.07E−12 | −8.09E−14 | 8.57E−16 | −5.40E−18 | 1.53E−20 |

In the 14 aspheric surfaces of the optical lens 410 shown in Table 18, a surface type z of each of the even extended aspheric surfaces may be defined by, including but not limited to, the following aspheric surface formula:

$$z = \frac{cr^2}{1 + \sqrt{1 - (K+1)c^2r^2}} + \sum_i Air^i$$

where z is a vector height of the aspheric surface, r is a radial coordinate of the aspheric surface, c is a spherical curvature of a vertex on the aspheric surface, K is a quadric surface constant, and Ai indicates an $i^{th}$-order aspheric surface coefficient.

Simulation is performed on the optical lens shown in FIG. 20, and a simulation result is described in detail below with reference to the accompanying drawings.

Figure 21:
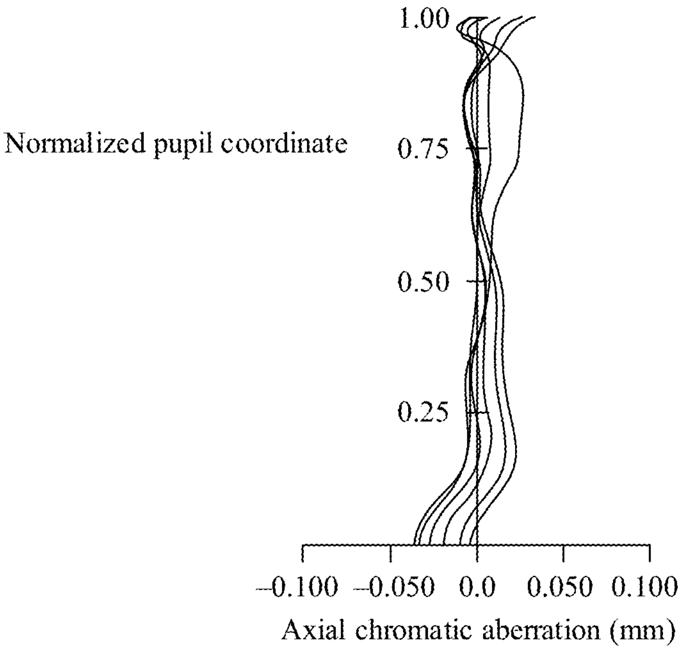
FIG. 21 is a curve diagram of an axial chromatic aberration of a fourth optical lens according to an embodiment of this application.

FIG. 21 is a curve diagram of an axial chromatic aberration of the sixth optical lens according to this embodiment of this application. Simulation results of depth of focus locations for color light of wavelengths of 650 nm, 610 nm, 555 nm, 510 nm, and 470 nm are separately shown in the figure. It can be seen that the axial chromatic aberration of the optical lens 410 can be controlled within a very small range.

Figure 22:
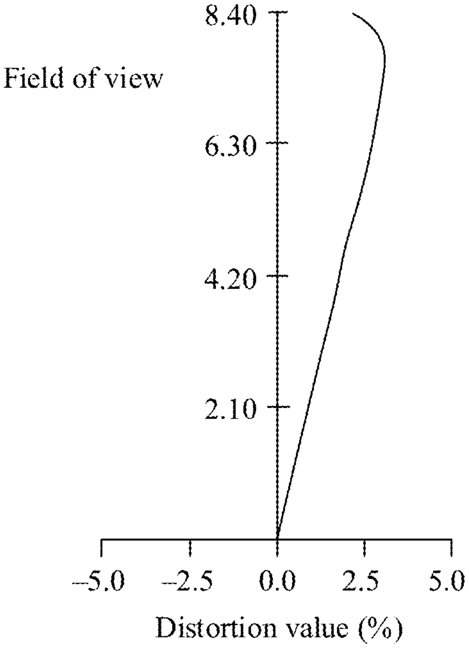
FIG. 22 is a curve diagram of optical distortion of a sixth optical lens according to an embodiment of this application.

FIG. 22 is a curve diagram of optical distortion of the sixth optical lens according to this embodiment of this application, and reflects deformation differences between actual imaging shapes and ideal shapes in different fields of view. It can be learned that the optical lens 410 can basically control the optical distortion within 3%.

It can be learned from structures and simulation effect of the first optical lens, the second optical lens, the third optical lens, the fourth optical lens, the fifth optical lens, and the sixth optical lens, that good imaging effect can be obtained by using the optical lens provided in embodiments of this application.

The descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. An optical lens, comprising at least seven lenses with a focal power that are arranged from an object side to an image side, wherein:

the optical lens is in a pop-up camera module;

in a direction from the object side to the image side, in the at least seven lenses, a first lens has a positive optical power, an object side surface that is of the first lens and that is near an optical axis is a convex surface, an image side surface that is of the first lens and that is near the optical axis is a concave surface, and a last lens has a negative focal power;

a back focal length BFL of the optical lens satisfies: BFL≤2.5 mm when the pop-up camera module is in a pop-up state; and in the direction from the object side to the image side, a point that is of the object side surface of the first lens and that is farthest away from an imaging surface of the optical lens in projection points of the optical axis of the optical lens is O1, a point that is of an image side surface of the last lens and that is closest to the imaging surface in the projection points of the optical axis is Ox, a distance between 1 and Ox is TTL1, TTL1 and an image height IH of the optical lens satisfy: TTL1/IH≤0.57, and x is a quantity of lenses.

2. The optical lens according to claim 1, further comprising a variable aperture located on an object side of the first lens arranged in the direction from the object side to the image side.

3. The optical lens according to claim 2, wherein a maximum entrance pupil diameter EPDmax and a minimum entrance pupil diameter EPDmin of the optical lens and a focal length EFL of the optical lens satisfy: $1.6 \le EFL/(EPDmax-EPDmin) \le 3$.

4. The optical lens according to claim 1, wherein in the direction from the object side to the image side, a focal length f1 of the first lens and a focal length EFL of the optical lens satisfy: $f1/EFL \le 1.3$.

5. The optical lens according to claim 1, wherein a focal length EFL of the optical lens and a maximum half-field of view HFOV of the optical lens satisfy: $EFL \times \tan(HFOV) \ge 7$ mm.

6. The optical lens according to claim 1, wherein a total track length TTL of the optical lens, the image height IH of the optical lens, and an F-number F # of the optical lens satisfy: $IH^2/(TTL^2 \times F\ \#) \ge 1.2$.

7. The optical lens according to claim 1, wherein an F-number F # of the optical lens and the image height IH of the optical lens satisfy: $IH/(4 \times F\ \#) \ge 1.85$.

8. The optical lens according to claim 1, wherein in the direction from the object side to the image side, a refractive index n2 of a second lens satisfies: $1.6 \le n2 \le 2.1$.

9. The optical lens according to claim 1, wherein in the direction from the object side to the image side, an Abbe coefficient vd1 of the first lens and an Abbe coefficient vd2 of a second lens satisfy: $|vd1-vd2| \ge 40$.

10. The optical lens according to claim 1, wherein at least one of:
- in the direction from the object side to the image side, at least one surface in an object side surface and an image side surface of a penultimate lens is a reversely curved surface; or
- in the direction from the object side to the image side, at least one surface in an object side surface and the image side surface of the last lens is a reversely curved surface.

11. The optical lens according to claim 1, wherein a total track length TTL of the optical lens and the back focal length BFL of the optical lens satisfy: $5 \le TTL/BFL \le 8$.

12. The optical lens according to claim 1, wherein:
- in the direction from the object side to the image side, an intersection point of the image side surface of the first lens and the optical axis is $O1_1$, a projection point of an edge of the image side surface of the first lens on the optical axis is $O1_2$, a distance between $O1_1$ and $O1_2$ is sag1, an intersection point of the object side surface of a second lens and the optical axis is $O2_1$, a projection point of an edge of the object side surface of the second lens on the optical axis is $O2_2$, a distance between $O2_1$ and $O2_2$ is sag2, and in an optical axis direction, a distance between the image side surface of the first lens and the object side surface of the second lens is T12; and sag1, sag2, and T12 satisfy: $T12-sag1+sag2 \ge 0.35$ mm.

13. The optical lens according to claim 1, wherein an entrance pupil diameter EPD of the optical lens and a half-image height ImgH of the optical lens satisfy: $0.5 \le EPD/ImgH \le 0.8$.

14. The optical lens according to claim 1, wherein in the direction from the object side to the image side, a center thickness CT2 and an edge thickness ET2 of a second lens satisfy: $0.8 \le CT2/ET2 \le 1.1$.

15. The optical lens according to claim 1, wherein the BFL of the optical lens satisfies: $1.627\ mm \le BFL \le 2.5$ mm when the pop-up camera module is in a pop-up state.

16. The optical lens according to claim 1, wherein in a direction from the object side to the image side, in the at least seven lenses, a third lens has a negative power, a fourth lens has a positive power, and a sixth lens has a positive power.

17. A camera module, comprising a photosensitive chip and an optical lens comprising at least seven lenses, wherein the photosensitive chip is disposed on an imaging surface of the optical lens, and the photosensitive chip is configured to convert an optical signal transmitted by the optical lens into an image signal, and wherein:
- in a direction from an object side to an image side, in the at least seven lenses, a first lens has a positive optical power, an object side surface that is of the first lens and that is near an optical axis is a convex surface, an image side surface that is of the first lens and that is near the optical axis is a concave surface, and a last lens has a negative focal power;
- a back focal length BFL of the optical lens satisfies: $BFL \le 2.5$ mm when the camera module is in a pop-up state; and
- in the direction from the object side to the image side, a point that is of the object side surface of the first lens and that is farthest away from an imaging surface of the optical lens in projection points of the optical axis of the optical lens is O1, a point that is of an image side surface of the last lens and that is closest to the imaging surface in the projection points of the optical axis is Ox, a distance between O1 and Ox is TTL1, TTL1 and an image height (IH) of the optical lens satisfy: $TTL1/IH \le 0.57$, and x is a quantity of lenses.

18. The camera module according to claim 17, wherein a total track length TTL of the optical lens and the back focal length BFL of the optical lens satisfy: $5 \le TTL/BFL \le 8$.

19. An electronic device, comprising a housing and a camera module, wherein:
- the camera module is disposed in the housing, and the camera module has a first state of being located inside the housing and a second state of being at least partially popped up to the outside of the housing;
- the camera module comprises a photosensitive chip and an optical lens comprising at least seven lenses, wherein the photosensitive chip is disposed on an imaging surface of the optical lens, and the photosensitive chip is configured to convert an optical signal transmitted by the optical lens into an image signal;
- in a direction from an object side to an image side, in the at least seven lenses, a first lens has a positive optical power, an object side surface that is of the first lens and that is near an optical axis is a convex surface, an image side surface that is of the first lens and that is near the optical axis is a concave surface, and a last lens has a negative focal power;
- a back focal length BFL of the optical lens satisfies: $BFL \le 2.5$ mm when the camera module is in a pop-up state; and
- in the direction from the object side to the image side, a point that is of the object side surface of the first lens and that is farthest away from an imaging surface of the optical lens in projection points of the optical axis of the optical lens is O1, a point that is of an image side surface of the last lens and that is closest to the imaging surface in the projection points of the optical axis is Ox, a distance between O1 and Ox is TTL1, TTL1 and an image height IH of the optical lens satisfy: $TTL1/IH \le 0.57$, and x is a quantity of lenses.

20. The electronic device according to claim 19, wherein a total track length TTL of the optical lens and the back focal length BFL of the optical lens satisfy: $5 \leq TTL/BFL \leq 8$.

* * * * *